(12) United States Patent
Kakugo

(10) Patent No.: US 12,492,234 B2
(45) Date of Patent: Dec. 9, 2025

(54) FIBER ASSEMBLY AND USE THEREOF

(71) Applicant: Kyoto University, Kyoto (JP)

(72) Inventor: Akira Kakugo, Sapporo (JP)

(73) Assignee: Kyoto University, Kyoto (JP)

( * ) Notice: Subject to any disclaimer, the term of this patent is extended or adjusted under 35 U.S.C. 154(b) by 1313 days.

(21) Appl. No.: 16/962,828

(22) PCT Filed: Jan. 17, 2019

(86) PCT No.: PCT/JP2019/001293
§ 371 (c)(1),
(2) Date: Mar. 19, 2021

(87) PCT Pub. No.: WO2019/142864
PCT Pub. Date: Jul. 25, 2019

(65) Prior Publication Data
US 2021/0277078 A1    Sep. 9, 2021

Related U.S. Application Data

(60) Provisional application No. 62/618,082, filed on Jan. 17, 2018.

(51) Int. Cl.
| | |
|---|---|
| *C07K 14/47* | (2006.01) |
| *A61K 35/34* | (2015.01) |
| *A61L 27/36* | (2006.01) |
| *C12N 15/113* | (2010.01) |

(52) U.S. Cl.
CPC .......... *C07K 14/4716* (2013.01); *A61K 35/34* (2013.01); *A61L 27/367* (2013.01); *C12N 15/113* (2013.01)

(58) Field of Classification Search
CPC ... C07K 14/4716; A61K 35/34; A61L 27/367; A61L 2300/258; A61L 27/54; A61L 27/227; A61L 2430/30; C12N 15/113
See application file for complete search history.

(56) References Cited

U.S. PATENT DOCUMENTS

2008/0207888 A1    8/2008    Hiyama et al.
2009/0156791 A1    6/2009    Hiyama et al.

FOREIGN PATENT DOCUMENTS

| JP | 2004159847 A | | 6/2004 |
|---|---|---|---|
| JP | 2006204241 A | * | 8/2006 |
| JP | 2006-271323 A | | 10/2006 |
| JP | 2007-111004 A | | 5/2007 |
| JP | 2008-206480 A | | 9/2008 |
| JP | 2008-222572 A | | 9/2008 |
| JP | 2011178692 A | * | 9/2011 |

OTHER PUBLICATIONS

Derr et al. Tug-of-War in Motor Protein Ensembles Revealed with a Programmable DNA Origami Scaffold. Science . Nov. 2, 2012; 338(6107):662-5. (Year: 2012).*

(Continued)

*Primary Examiner* — Marcia S Noble
*Assistant Examiner* — Briana N Ebbinghaus
(74) *Attorney, Agent, or Firm* — Wolf, Greenfield & Sacks, P.C.

(57) ABSTRACT

A fiber assembly includes multiple fibers and nucleic acid fragments that crosslink the multiple fibers, and the fibers are microtubules or actin fibers.

5 Claims, 13 Drawing Sheets

Specification includes a Sequence Listing.

(56) References Cited

OTHER PUBLICATIONS

Wada et al. Effect of length and rigidity of microtubules on the size of ring-shaped assemblies obtained through active self-organization. Soft Matter. Feb. 14, 2015;11(6):1151-7. (Year: 2015).*
Japanese Office Action for App. No. JP 2019-566501 mailed Dec. 23, 2022.
Saito et al., Designing of Sarcomere Unit from Microtubules and Kinesins for Construction of Artificial Muscles. Biological Physics. Aug. 2017; 57(1-2): S321, 3Pos085.
Notice of Allowance for Japanese Application No. 2019-566501, mailed Jun. 20, 2023.
International Search Report and Written Opinion mailed Apr. 16, 2019 in connection with International Application No. PCT/JP2019/001293.
Kawamura et al., Ring-shaped assembly of microtubules shows preferential counterclockwise motion. Biomacromolecules. Sep. 2008;9(9):2277-82. doi: 10.1021/bm800639w. Epub Jul. 29, 2008.
Keya et al., DNA-assisted swarm control in a biomolecular motor system. Nat Commun. Jan. 31, 2018;9(1):453. doi: 10.1038/s41467-017-02778-5.
Keya et al., Control of swarming of molecular robots. Sci Rep. Aug. 6, 2018;8(1):11756. doi: 10.1038/s41598-018-30187-1.

* cited by examiner

FIBER ASSEMBLY AND USE THEREOF

CROSS REFERENCE TO RELATED APPLICATIONS

This Application is a National Stage filing under 35 U.S.C. 371 of International Patent Application No. PCT/JP2019/001293, filed Jan. 17, 2019, which claims priority to U.S. Application Ser. No. 62/618,082, filed Jan. 17, 2018. The entire contents of these applications are incorporated herein by reference in their entirety.

REFERENCE TO AN ELECTRONIC SEQUENCE LISTING

The contents of the electronic sequence listing (N063370001US00-SUBSEQ-JDH.txt; Size: 11,696 bytes; and Date of Creation: Mar. 19, 2021) is herein incorporated by reference in its entirety.

Fiber Assembly and Use Thereof

TECHNICAL FIELD

The present invention relates to a fiber assembly and a use thereof. More specifically, the present invention relates to a fiber assembly, a method of producing a fiber assembly, a method of dissociating a fiber assembly into single fibers, a method of moving a fiber assembly, artificial muscles, and a method of contracting artificial muscles. Priority is claimed on U.S. Provisional Application No. 62/618,082, filed Jan. 17, 2018, the content of which is incorporated herein by reference.

Reference to a Sequence Listing Submitted as a Text File Via EFS-WEB

The instant application contains a Sequence Listing which has been submitted in ASCII format via EFS-Web and is hereby incorporated by reference in its entirety. Said ASCII copy, created on Nov. 4, 2020, is named N066370001US00-SUBSEQ and is 11 kilobytes in size.

BACKGROUND ART

Kinesins are motor proteins that convert chemical energy obtained by hydrolysis of adenosine triphosphate (ATP) into kinetic energy and move on microtubules that are cytoskeletons. Regarding a method of observing this kinesin-microtubule system in vitro, an in vitro motility assay is widely used.

In this assay method, kinesins are immobilized on a glass substrate, microtubules labeled with a fluorescent dye are bound, and ATP is added. As a result, it is possible to observe a state in which microtubules slide on the substrate covered with kinesins, unlike in vivo, under a fluorescence microscope.

For example, Non-Patent Literature 1 discloses that, when microtubules obtained by polymerizing tubulins in the presence of guanosine-5'-triphosphate (GTP) are slid on a substrate covered with kinesins and crosslinked due to a ligand-receptor interaction, the microtubules are associated to form a ring and circularly move.

CITATION LIST

Non-Patent Literature

Non-Patent Literature 1
Kawamura R., et al., Ring-shaped assembly of microtubules shows preferential counterclockwise motion, Biomacromolecules, 9 (9), 2277-2282, 2008.

SUMMARY OF INVENTION

Technical Problem

However, in the method described in Non-Patent Literature 1, it is difficult to dissociate the microtubules temporarily crosslinked, and movement of microtubules can be controlled only in a limited manner. An object of the present invention is to provide a novel technology for controlling assembling of fibers.

Solution to Problem

The present invention includes the following aspects.

[1] A fiber assembly, including: multiple fibers; and nucleic acid fragments that crosslink the multiple fibers, wherein the fibers are microtubules or actin fibers.

[2] The fiber assembly according to [1], wherein the fibers include a first fiber and a second fiber, wherein a first single-stranded nucleic acid fragment is bound to the first fiber, wherein a second single-stranded nucleic acid fragment is bound to the second fiber, wherein a third single-stranded nucleic acid fragment including a region complementary to the first single-stranded nucleic acid fragment and a region complementary to the second single-stranded nucleic acid fragment hybridizes with the first single-stranded nucleic acid fragment and the second single-stranded nucleic acid fragment, and thus the first fiber and the second fiber are crosslinked.

[3] A method of producing a fiber assembly, wherein the fibers are microtubules or actin fibers, the production method includes bringing a first fiber to which a first single-stranded nucleic acid fragment is bound, a second fiber to which a second single-stranded nucleic acid fragment is bound, and a third single-stranded nucleic acid fragment including a region complementary to the first single-stranded nucleic acid fragment and a region complementary to the second single-stranded nucleic acid fragment into contact with each other.

[4] A method of dissociating a fiber assembly into single fibers, wherein the fibers are microtubules or actin fibers, wherein the fiber assembly includes a first fiber to which a first single-stranded nucleic acid fragment is bound, a second fiber to which a second single-stranded nucleic acid fragment is bound, and a third single-stranded nucleic acid fragment including a region complementary to the first single-stranded nucleic acid fragment and a region complementary to the second single-stranded nucleic acid fragment, and wherein the method includes bringing a fourth single-stranded nucleic acid fragment including a region complementary to the third single-stranded nucleic acid fragment into contact with the assembly.

[5] A method of moving a fiber assembly, wherein the fibers are microtubules or actin fibers, wherein the fiber assembly includes a first fiber to which a first single-stranded nucleic acid fragment is bound, a second fiber to which a second single-stranded nucleic acid fragment is bound, and a third single-stranded nucleic acid fragment including a region complementary to the first single-stranded nucleic acid fragment and a region complementary to the second single-stranded nucleic acid fragment, and wherein the method includes bringing the fiber assembly and adenosine triphosphate (ATP) into contact with each other on a substrate whose surface is covered with motor proteins.

[6] The method according to [5], wherein the fibers are microtubules, and the motor proteins are kinesins or dyneins.

[7] The method according to [6], wherein the microtubules are polymerized in the presence of guanosine-5'-triphosphate (GTP), and the fiber assembly moves in an arc.

[8] The method according to [6] or [7], wherein at least some of the microtubules are polymerized in the presence of guanosine-5'-[α,β-methylene]triphosphate (GMPCPP), and the fiber assembly moves linearly.

[9] The method according to [5], wherein the fibers are actin fibers, and the motor proteins are myosins.

[10] Artificial muscles, including: multiple microtubules; and kinesin or dynein multimers that crosslink the multiple microtubules.

[11] The artificial muscles according to [10], wherein the kinesin or dynein multimers are a complex of biotinylated kinesin or biotinylated dynein, and avidin.

[12] The artificial muscles according to [10] or [11], wherein the multiple microtubules include a first microtubule and a second microtubule, wherein a first single-stranded nucleic acid fragment is bound to the first microtubule, wherein a second single-stranded nucleic acid fragment is bound to the second microtubule, wherein a third single-stranded nucleic acid fragment including a region complementary to the first single-stranded nucleic acid fragment and a region complementary to the second single-stranded nucleic acid fragment hybridizes with the first single-stranded nucleic acid fragment and the second single-stranded nucleic acid fragment, and thus the first microtubule and the second microtubule are crosslinked.

[13] A method of contracting the artificial muscles, including bringing ATP into contact with the artificial muscles according to any one of [10] to [12].

Advantageous Effects of Invention

According to the present invention, it is possible to provide a novel technology for controlling assembling of fibers.

DESCRIPTION OF EMBODIMENTS

[Fiber Assembly]

In one embodiment, the present invention provides a fiber assembly which includes multiple fibers and nucleic acid fragments that crosslink the multiple fibers, and the fibers are microtubules or actin fibers. As will be described below in examples, according to the fiber assembly of the present embodiment, it is possible to control association of fibers. The nucleic acid fragment may be DNA, RNA, or a mixture of DNA and RNA. In addition, the nucleic acid fragment may include partial or entire nucleic acid analogs such as PNA and LNA. In addition, as will be described below, the nucleic acid fragment may have a photoresponsive group. Examples of photoresponsive groups include an azobenzene group.

First Embodiment

In a fiber assembly of a first embodiment, the fibers include a first fiber and a second fiber, a first single-stranded nucleic acid fragment is bound to the first fiber, a second single-stranded nucleic acid fragment is bound to the second fiber, a third single-stranded nucleic acid fragment including a region complementary to the first single-stranded nucleic acid fragment and a region complementary to the second single-stranded nucleic acid fragment hybridizes with the first single-stranded nucleic acid fragment and the second single-stranded nucleic acid fragment, and thus the first fiber and the second fiber are crosslinked.

Figure 6:
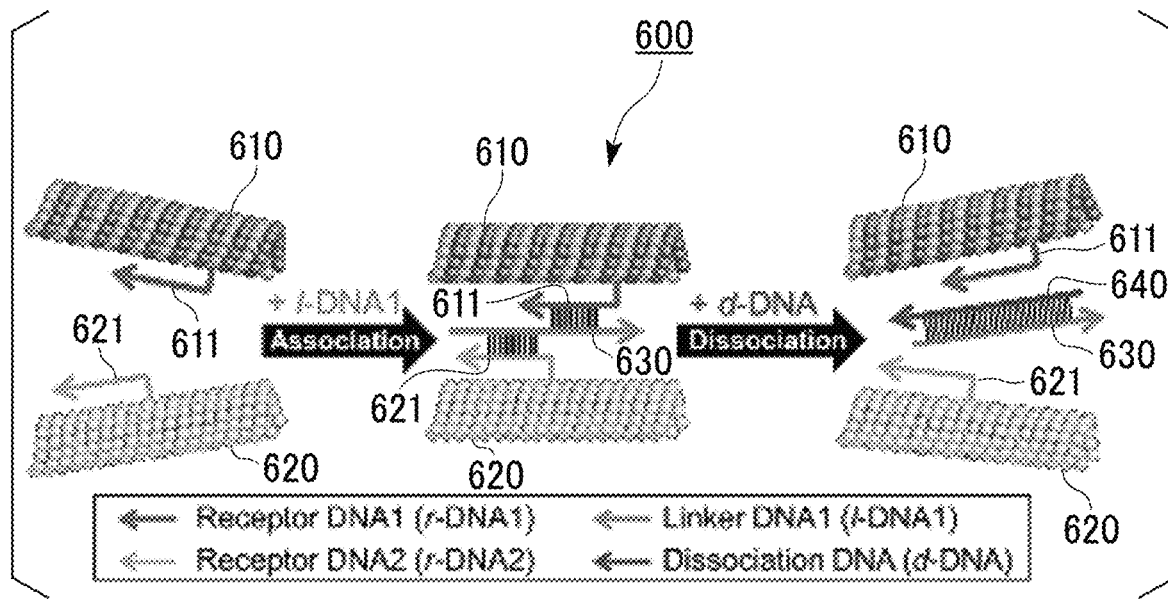
FIG. 6 is a schematic view showing a state in which red-labeled microtubules and green-labeled microtubules are crosslinked and associated by a linker DNA (l-DNA) and a state in which l-DNA is dissociated due to a strand exchange reaction using dissociation DNA (d-DNA) and the associated red-labeled microtubules and green-labeled microtubules are dissociated.

The fiber assembly of the first embodiment will be described with reference to FIG. 6. A fiber assembly 600 of the first embodiment includes first fibers 610 and second fibers 620. A first single-stranded nucleic acid fragment 611 is bound to the first fiber 610. A second single-stranded nucleic acid fragment 621 is bound to the second fiber 620.

Here, a third single-stranded nucleic acid fragment 630 including a region complementary to the first single-stranded nucleic acid fragment 611 and a region complementary to the second single-stranded nucleic acid fragment 621 hybridizes with the first single-stranded nucleic acid fragment 611 and the second single-stranded nucleic acid fragment 621 to crosslink the first fiber 610 and the second fiber 620. The first single-stranded nucleic acid fragment 611 and the second single-stranded nucleic acid fragment 621 correspond to a receptor DNA (r-DNA) to be described below. In addition, the third single-stranded nucleic acid fragment 630 corresponds to a linker DNA (l-DNA) to be described below.

As will be described below in examples, in the fiber assembly of the first embodiment, the first fiber 610 and the second fiber 620 can be dissociated when dissociation DNA (d-DNA) 640 is brought into contact therewith.

Second Embodiment

In a fiber assembly of a second embodiment, the fibers include a first fiber and a second fiber, a first single-stranded nucleic acid fragment is bound to the first fiber, a second single-stranded nucleic acid fragment is bound to the second fiber, an azobenzene group is introduced into the first single-stranded nucleic acid fragment and the second single-stranded nucleic acid fragment, the azobenzene group has a trans form, the first single-stranded nucleic acid fragment and the second single-stranded nucleic acid fragment hybridize, and thus the first fiber and the second fiber are crosslinked.

Figure 17:
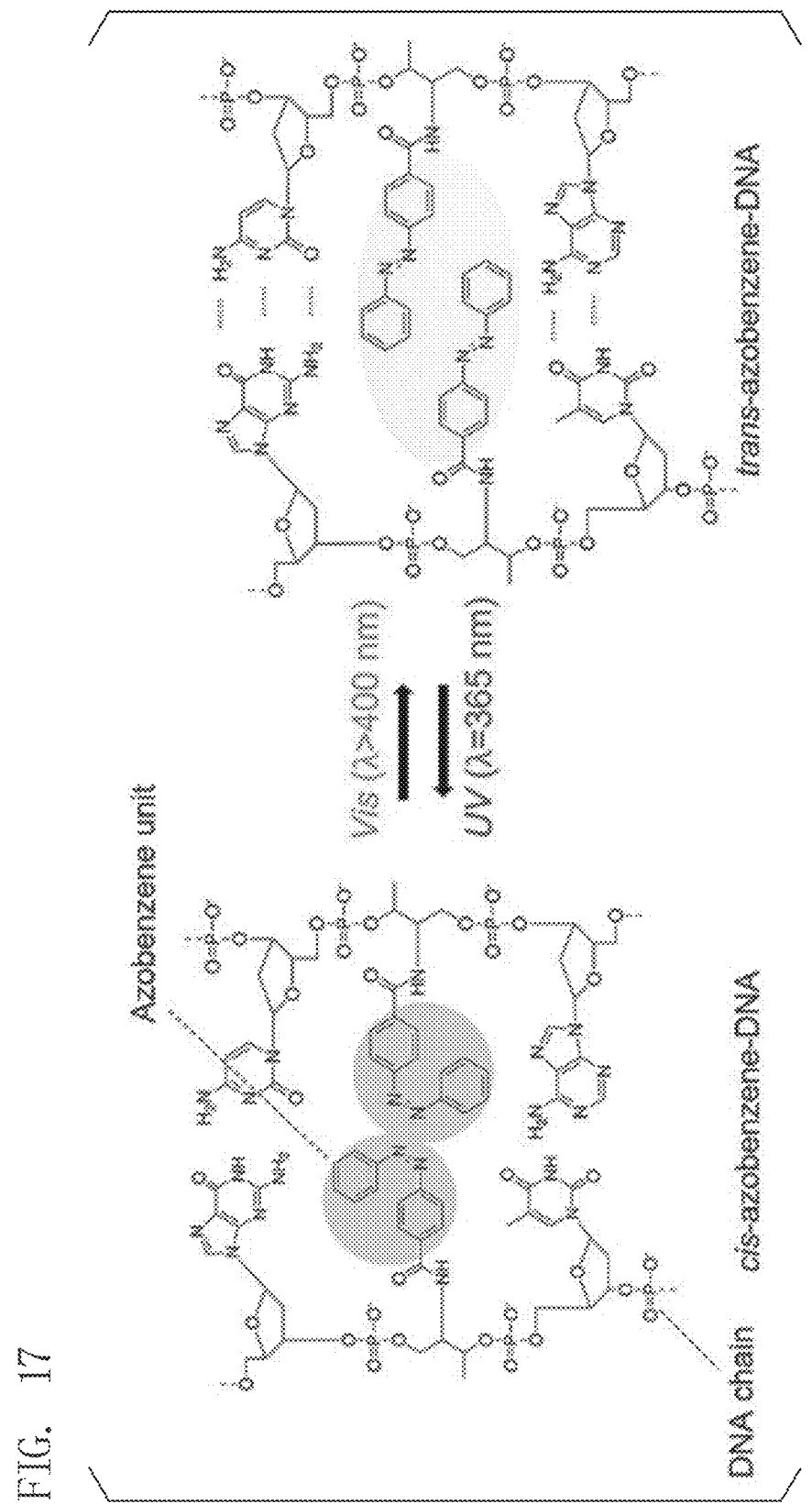
FIG. 17 is a schematic view illustrating a state in which DNA hybridization is reversibly switched on/off by cis-trans isomerization of azobenzene moieties of two pieces of photoresponsive DNA in Experimental Example 6.

A single-stranded nucleic acid into which an azobenzene group is introduced will be described with reference to FIG. 17. As shown in FIG. 17, an azobenzene group in place of some bases is introduced into the single-stranded nucleic acid used in the fiber assembly of the second embodiment. The azobenzene group changes to a trans form when UV light (UV) is emitted and can raise the melting temperature (Tm). In addition, the azobenzene group changes to a cis form when visible light is emitted and Tm decreases. This change is reversible, and can be repeated.

Therefore, when an azobenzene group is introduced into the first single-stranded nucleic acid fragment and the second single-stranded nucleic acid fragment, it is possible to control hybridization and dissociation of the first single-stranded nucleic acid fragment and the second single-stranded nucleic acid fragment by emitting UV light (UV) or visible light.

Figure 18:
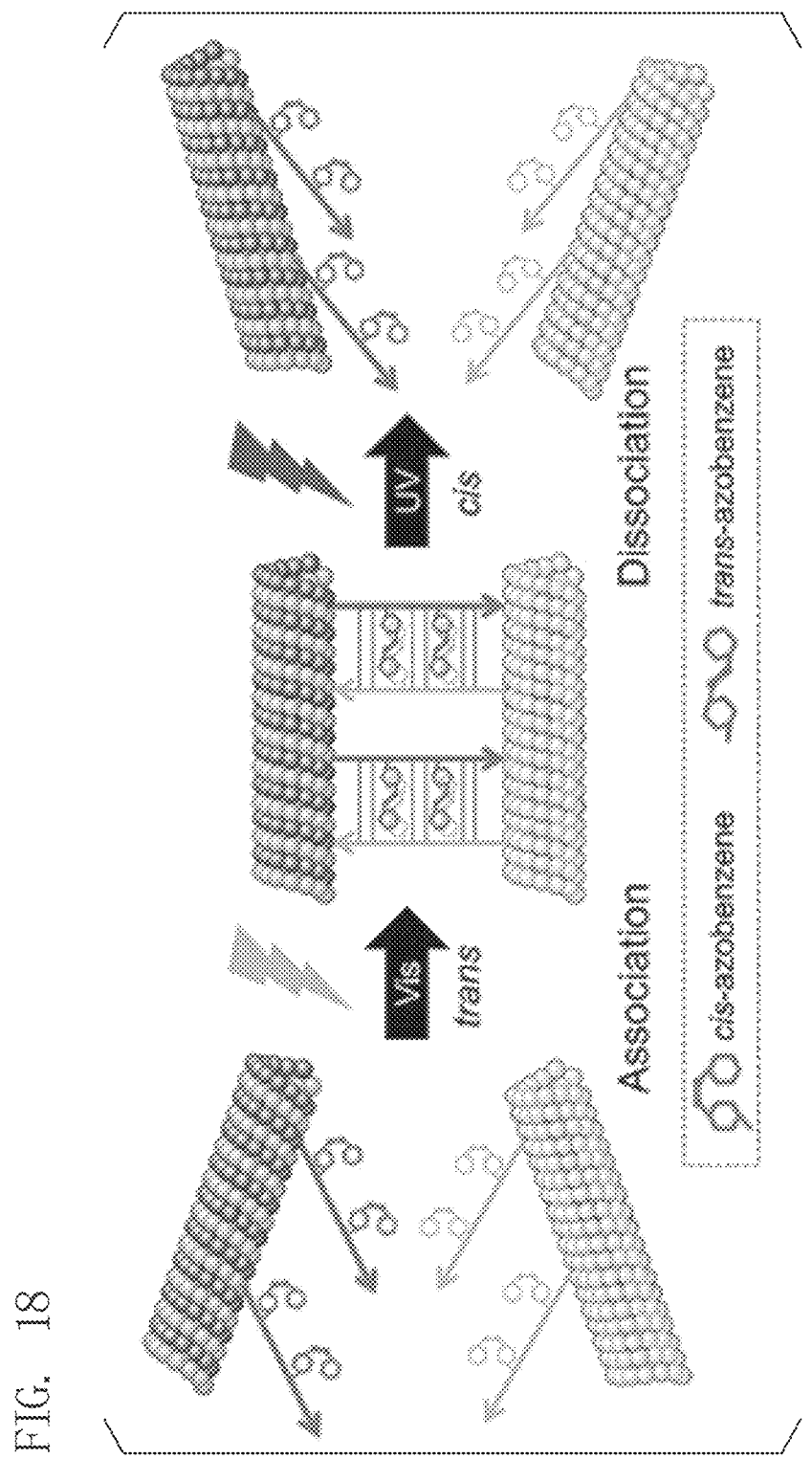
FIG. 18 is a schematic view illustrating a state in which, in Experimental Example 6, when UV or visible light is emitted to microtubules to which photoresponsive DNA (p-DNA) is bound, an assembly is formed and dissociated.

As shown in FIG. 18, in the fiber assembly of the second embodiment, when UV light (UV) or visible light is emitted, cis-trans isomerization of the azobenzene group introduced into the first single-stranded nucleic acid fragment and the second single-stranded nucleic acid fragment is controlled, and formation and dissociation of the assembly can be controlled.

[Method of Producing Fiber Assembly]

First Embodiment

In a method of producing a fiber assembly of the first embodiment, the fibers are microtubules or actin fibers, and the production method includes bringing a first fiber to which a first single-stranded nucleic acid fragment is bound, a second fiber to which a second single-stranded nucleic acid fragment is bound, and a third single-stranded nucleic acid fragment including a region complementary to the first single-stranded nucleic acid fragment and a region complementary to the second single-stranded nucleic acid fragment into contact with each other. According to the production method of the present embodiment, it is possible to produce the above fiber assembly of the first embodiment.

The method of producing a fiber assembly of the first embodiment will be described with reference to FIG. 6. The first fiber 610 to which the first single-stranded nucleic acid fragment 611 is bound, the second fiber 620 to which the second single-stranded nucleic acid fragment 621 is bound, and the third single-stranded nucleic acid fragment 630 including a region complementary to the first single-stranded nucleic acid fragment 611 and a region complementary to the second single-stranded nucleic acid fragment 620 are brought into contact with each other.

The first single-stranded nucleic acid fragment, the second single-stranded nucleic acid fragment, and the third single-stranded nucleic acid fragment hybridize with each other. As a result, the first fiber 610 and the second fiber 620 are crosslinked, and a fiber assembly can be produced.

Second Embodiment

In a method of producing a fiber assembly of the second embodiment, the fibers are microtubules or actin fibers, and the production method includes bringing a first fiber to which a first single-stranded nucleic acid fragment is bound and a second fiber to which a second single-stranded nucleic acid fragment is bound into contact with each other under conditions in which the first single-stranded nucleic acid fragment and the second single-stranded nucleic acid fragment hybridize, and in which an azobenzene group is introduced into the first single-stranded nucleic acid fragment and the second single-stranded nucleic acid fragment, and the conditions for hybridizing are conditions in which the azobenzene group is converted into a trans form. According to the production method of the present embodiment, it is possible to produce the above fiber assembly of the second embodiment.

As shown in FIG. 18, in the production method of the second embodiment, when an azobenzene group introduced into the first single-stranded nucleic acid fragment and the second single-stranded nucleic acid fragment is converted into a trans form, the first single-stranded nucleic acid fragment and the second single-stranded nucleic acid fragment hybridize. As a result, the first fiber and the second fiber are crosslinked, and a fiber assembly can be produced.
[Method of Dissociating Fiber Assembly into Single Fibers]

First Embodiment

The method of the first embodiment is a method of dissociating a fiber assembly into single fibers, and in which the fibers are microtubules or actin fibers, and the fiber assembly includes a first fiber to which a first single-stranded nucleic acid fragment is bound, a second fiber to which a second single-stranded nucleic acid fragment is bound, and a third single-stranded nucleic acid fragment including a region complementary to the first single-stranded nucleic acid fragment and a region complementary to the second single-stranded nucleic acid fragment, and the method includes bringing a fourth single-stranded nucleic acid fragment including a region complementary to the third single-stranded nucleic acid fragment into contact with the assembly.

The method of the first embodiment is a method of dissociating the above fiber assembly of the first embodiment. The method of the first embodiment will be described with reference to FIG. 6. As described above, the fiber assembly 600 of the first embodiment includes the first fiber 610 to which the first single-stranded nucleic acid fragment 611 is bound, the second fiber 620 to which the second single-stranded nucleic acid fragment 621 is bound, and the third single-stranded nucleic acid fragment including a region complementary to the first single-stranded nucleic acid fragment and a region complementary to the second single-stranded nucleic acid fragment.

When a fourth single-stranded nucleic acid fragment 640 including a region complementary to the third single-stranded nucleic acid fragment 630 is brought into contact with the fiber assembly 600 of the first embodiment, the fourth single-stranded nucleic acid fragment 640 undergoes a strand exchange reaction with the first single-stranded nucleic acid fragment 611 and the second single-stranded nucleic acid fragment 621, and hybridizes with the third single-stranded nucleic acid fragment 630. As a result, the first fiber 610 and the second fiber 620 are dissociated.

Second Embodiment

The method of the second embodiment is a method of dissociating a fiber assembly into single fibers, in which the fibers are microtubules or actin fibers, the fiber assembly includes a first fiber to which a first single-stranded nucleic acid fragment is bound and a second fiber to which a second single-stranded nucleic acid fragment is bound, an azobenzene group is introduced into the first single-stranded nucleic acid fragment and the second single-stranded nucleic acid fragment, the azobenzene group has a trans form, and the first single-stranded nucleic acid fragment and the second single-stranded nucleic acid fragment are hybridized to associate the fibers, and the method includes dissociating the first single-stranded nucleic acid fragment and the second single-stranded nucleic acid fragment by emitting UV light to the fiber assembly and converting the azobenzene group into a cis form.

The method of the second embodiment is a method of dissociating the above fiber assembly of the second embodiment. As described above, in the fiber assembly of the second embodiment, the fibers include a first fiber and a second fiber. Here, a first single-stranded nucleic acid fragment is bound to the first fiber, and a second single-stranded nucleic acid fragment is bound to the second fiber. Here, an azobenzene group is introduced into the first single-stranded nucleic acid fragment and the second single-stranded nucleic acid fragment, the azobenzene group has a trans form, the first single-stranded nucleic acid fragment and the second single-stranded nucleic acid fragment hybridize, and thus the first fiber and the second fiber are crosslinked.

As shown in FIG. 18, in the method of the second embodiment, when the azobenzene group of the above fiber assembly of the second embodiment is converted into a cis form, the hybridized first single-stranded nucleic acid fragment and second single-stranded nucleic acid fragment are dissociated. As a result, the first fiber and the second fiber can be dissociated.

Examples of a method of converting an azobenzene group into a cis form include emission of UV light (UV).
[Method of Moving a Fiber Assembly]

In one embodiment, the present invention provides a method of moving a fiber assembly. The method of the present embodiment is a method including bringing the fiber assembly and adenosine triphosphate (ATP) into contact with each other on a substrate whose surface is covered with motor proteins. In the method of the present embodiment, the fiber assembly may be the above fiber assembly of the first embodiment or the above fiber assembly of the second embodiment.

In the method of the present embodiment, the fibers are microtubules, and the motor proteins may be kinesins or dyneins.

Here, the microtubules may be obtained by polymerizing tubulins in the presence of guanosine-5'-triphosphate (GTP). The microtubules obtained by polymerization in the presence of GTP are soft microtubules, and microtubules having low rigidity. As will be described below in examples, when the assembly of soft microtubules is moved by the method of the present embodiment, it moves in an arc.

Alternatively, at least some of the microtubules may be obtained by polymerizing tubulins in the presence of guanosine-5'-[α,β-methylene]triphosphate (GMPCPP). The microtubules obtained by polymerization in the presence of GMPCPP are rigid microtubules and microtubules having high rigidity. As will be described below in examples, when the assembly of rigid microtubules is moved by the method of the present embodiment, it moves linearly.

In addition, in the method of the present embodiment, the fibers are actin fibers, and the motor proteins may be myosins.
[Artificial Muscles]

In one embodiment, the present invention provides artificial muscles including a multiple microtubules and kinesin or dynein multimers that crosslink the multiple microtubules.

In the artificial muscles of the present embodiment, the kinesin or dynein multimers may be a complex of biotinylated kinesin or biotinylated dynein, and avidin.

In the artificial muscles of the present embodiment, the multiple microtubules includes a first microtubule and a second microtubule, a first single-stranded nucleic acid fragment is bound to the first microtubule, a second single-stranded nucleic acid fragment is bound to the second microtubule, a third single-stranded nucleic acid fragment including a region complementary to the first single-stranded nucleic acid fragment and a region complementary to the second single-stranded nucleic acid fragment hybridizes with the first single-stranded nucleic acid fragment and the second single-stranded nucleic acid fragment, and thus the first microtubule and the second microtubule may be crosslinked. That is, in the artificial muscles of the present embodiment, the multiple microtubules may be the above fiber assembly of the first embodiment.

Alternatively, in the artificial muscles of the present embodiment, the multiple microtubules include a first microtubule and a second microtubule, a first single-stranded nucleic acid fragment is bound to the first microtubule, a second single-stranded nucleic acid fragment is bound to the second microtubule, an azobenzene group is introduced into the first single-stranded nucleic acid fragment and the second single-stranded nucleic acid fragment, the azobenzene group has a trans form, the first single-stranded nucleic acid fragment and the second single-stranded nucleic acid fragment hybridize, and thus the first microtubule and the second microtubule may be crosslinked. That is, in the artificial muscles of the present embodiment, the multiple microtubules may be the above fiber assembly of the second embodiment.

When ATP is brought into contact with the artificial muscles of the present embodiment, the artificial muscles can be contracted.

EXAMPLES

Next, the present invention will be described in more detail with reference to examples, but the present invention is not limited to the following examples.

[Materials and Methods]

(Preparation of Tubulin)

Tubulins were purified from porcine brain. For purification, a PIPES buffer (1 M PIPES, 20 mM EGTA, 10 mM MgCl$_2$) was used. The purified tubulins were stored in a BRB80 buffer (80 mM PIPES, 1 mM EGTA, 2 mM MgCl$_2$, pH 6.8).

Then, azido tubulins were prepared using N$_3$-PEG$_4$-NHS. The concentration of tubulins was measured by measuring an absorbance at 280 nm using a UV spectrometer (Nanodrop 2000c).

(Preparation of Kinesin)

A recombinant kinesin-1 in which a His×6 tag, a thrombin cleavage site, an S epitope tag, and a DDDDK tag are linked in that order to the N-terminal side of 1st to 573$^{rd}$ amino acids of human kinesin-1 was prepared. The amino acid sequence of the prepared recombinant kinesin-1 is shown as SEQ ID NO: 1.

(Design of DNA Fragment)

Nucleotide sequences of a receptor DNA (r-DNA), a linker DNA (l-DNA) and dissociation DNA (d-DNA) were designed. The design was performed based on a simulation of a melting temperature (Tm). The simulation of Tm was performed using software ("OligoAnalyzer 3.1", sg.idtdna.com/calc/analyzer). The simulation was performed by setting the range of Tm to 0 to 50° C. Regarding DNA for a logic gate experiment, the nucleotide sequence was designed not only to satisfy Tm conditions but also to prevent an undesired interaction between DNA strands.

Figure 1:
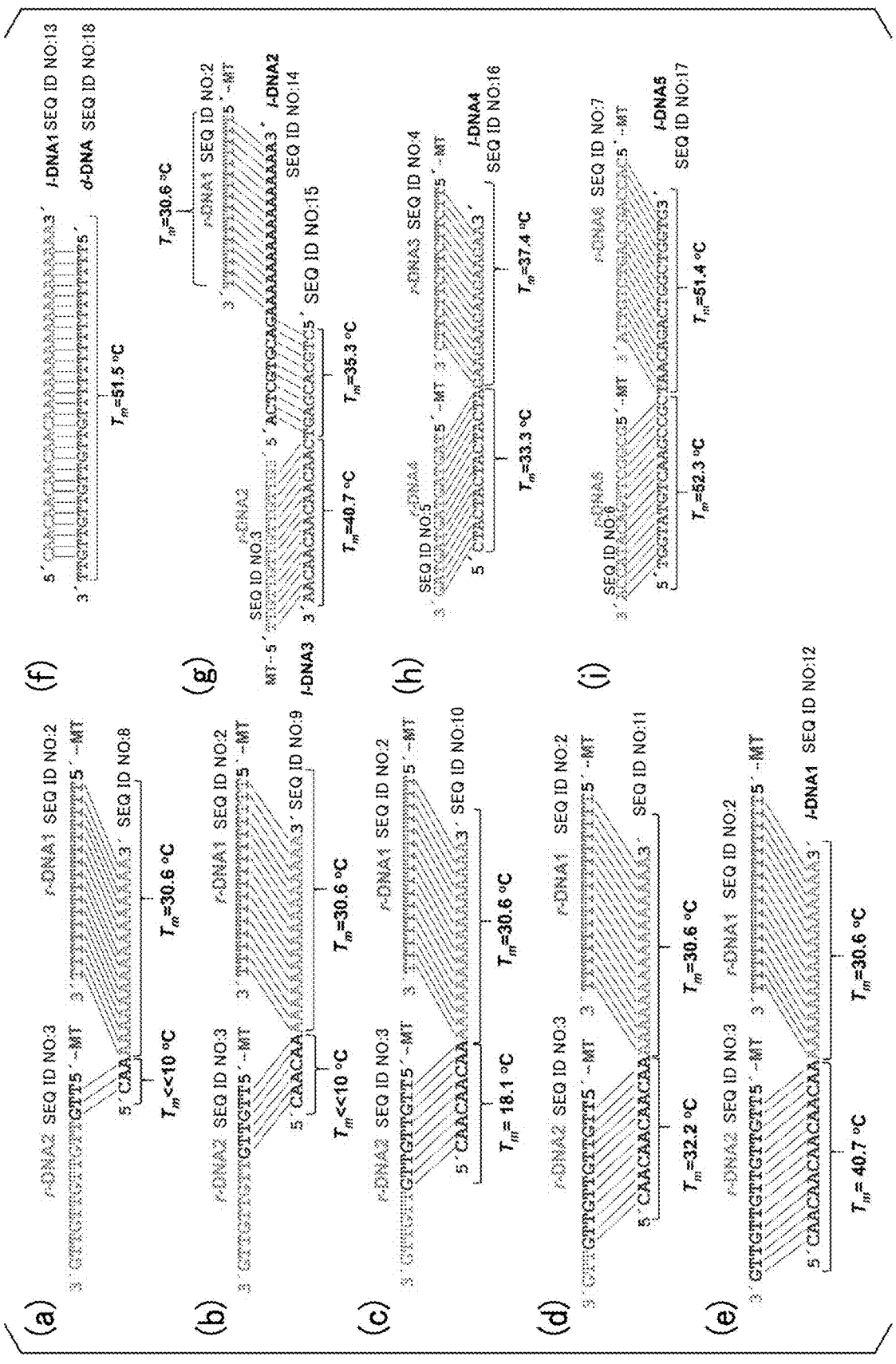
FIGS. 1(a) to 1(i) are diagrams showing nucleotide sequences and Tm of designed DNA.

FIGS. 1(a) to 1(i) are diagrams showing the designed DNA nucleotide sequence and Tm. In FIGS. 1(a) to 1(i), "MT" indicates a microtubule. FIG. 1(a) is a diagram showing Tm of r-DNA1 (T$_{16}$, SEQ ID NO: 2), r-DNA2 ((TTG)$_5$, SEQ ID NO: 3) and CAAA$_{16}$ (SEQ ID NO: 8). FIG. 1(b) is a diagram showing Tm of r-DNA1 (T$_{16}$, SEQ ID NO: 2), r-DNA2 ((TTG)$_5$, SEQ ID NO: 3) and (CAA)$_2$A$_{16}$ (SEQ ID NO: 9). FIG. 1(c) is a diagram showing Tm of r-DNA1 (T$_{16}$, SEQ ID NO: 2), r-DNA2 ((TTG)$_5$, SEQ ID NO: 3) and (CAA)$_3$A$_{16}$ (SEQ ID NO: 10).

FIG. 1(d) is a diagram showing Tm of r-DNA1 (T$_{16}$, SEQ ID NO: 2), r-DNA2 ((TTG)$_5$, SEQ ID NO: 3) and (CAA)$_4$A$_{16}$ (SEQ ID NO: 11). FIG. 1(e) is a diagram showing Tm of r-DNA1 (T$_{16}$, SEQ ID NO: 2), r-DNA2 ((TTG)$_5$, SEQ ID NO: 3) and (CAA)$_5$A$_{16}$ (SEQ ID NO: 12). FIG. 1(f) is a diagram showing Tm of l-DNA1 ((CAA)$_5$A$_{16}$, SEQ ID NO: 13) and d-DNA (T$_{16}$(GTT)$_5$, SEQ ID NO: 18). d-DNA is DNA used in a DNA strand displacement reaction.

FIG. 1(g) is a diagram showing Tm of r-DNA1 (T$_{16}$, SEQ ID NO: 2), r-DNA2 ((TTG)$_5$, SEQ ID NO: 3), l-DNA2 (ACTCGTGCAGA$_{16}$, SEQ ID NO: 14) and l-DNA3 (CTGCACGAGT(CAA)$_5$, SEQ ID NO: 15). These DNAs were used for calculating an AND gate.

FIG. 1(h) is a diagram showing Tm of r-DNA3 ((TTC)$_5$, SEQ ID NO: 4), r-DNA4 ((TAG)$_5$, SEQ ID NO: 5) and l-DNA4 ((CTA)$_5$(GAA)$_5$, SEQ ID NO: 16). These DNAs were used for calculating an OR gate together with the DNA shown in FIG. 1(e).

FIG. 1(i) is a diagram showing Tm of r-DNA5 (GCGGCTTGACATACCA, SEQ ID NO: 6), r-DNA6 (CACCAGCCAGTCTGTTA, SEQ ID NO: 7) and l-DNA5 (TGGTATGTCAAGCCGCTAACAGACTGGCTGGTG, SEQ ID NO: 17). These DNAs were used for rigid microtubules labeled with green fluorescence and used for calculating a logic gate together with the DNA shown in FIG. 1(e) used for soft microtubules labeled with red fluorescence.

The DNA labeled with dibenzocyclooctyne (DBCO) and a fluorescent dye was synthesized by chemical synthesis using a CPG column and a phosphoamidite (commercially available from Glen Research Corporation). A DNA synthesizer (ABI3900) was used for chemical synthesis. The chemically synthesized DNA was purified through reversed-phase HPLC, and the structure was confirmed through MALDI-TOF/MS (Bruker MicroflexLRF).

The 3' end of r-DNA was labeled with 5(6)-carboxytetramethylrhodamine (TAMRA) or 5-carboxyfluorescein (FAM). In addition, 5' end was labeled with DBCO. The photoresponsive DNA (p-DNA) was synthesized in the laboratory. Specifically, using a phosphoramidite form of D-threoninol into which an azobenzene group was introduced, p-DNA was synthesized using a DNA synthesizer (product name "ABI 3400 DNA/RNA synthesizer", commercially available from Applied Biosystems). Then, the synthesized p-DNA was purified through a Poly-Pak cartridge (commercially available from Glen Research Corporation) and reversed-phase HPLC, and the sequence was confirmed trough MALDI-TOF MS. In addition, l-DNA and d-DNA were purchased from Eurofins Genomics K.K.

(Preparation of Microtubules)

Microtubules were prepared by adding azido tubulins to a polymerization buffer (80 mM PIPES, 1 mM EGTA, 1 mM MgCl$_2$, 1 mM polymerization reagent, pH 6.8) to a final concentration of 56 µM, and performing incubation at 37° C. for 30 minutes.

In order to prepare soft microtubules, guanosine triphosphate (guanosine-5'-triphosphate, GTP) was used as a polymerization reagent. In order to prepare rigid microtubules, guanosine-5'-[α,β-methylene]triphosphate (GMPCPP) was used as a polymerization reagent. GMPCPP was an analog of GTP that was hydrolyzed more slowly than GTP. In order to prepare soft microtubules, dimethyl sulfoxide (DMSO) was added to a final concentration of 5%.

A copper-free click reaction was initiated by adding 3.5 µL of DBCO-modified r-DNA (500 µM) to 5 µL of azide microtubules (56 µM) and incubation was performed at 37° C. for 6 hours to cause an azide-alkyne cycloaddition reaction.

Then, centrifugation was performed using 100 µL of a cushion buffer (obtained by adding 60% glycerol to a BRB80 buffer) at 201,000×g (S55A2-0156 rotor, commercially available from Hitachi Koki Co., Ltd.) for 1 hour at 37° C. to precipitate microtubules. After the supernatant was removed, the microtubules to which r-DNA was bound were washed once with 100 µL of a BRB80P buffer (obtained by adding 1 mM of taxol to a BRB80 buffer) and suspended in 15 µL of the BRB80P buffer. Microtubules to which p-DNA was bound were prepared by the same procedure.

(Formation of Assembly of Microtubules)

A flow cell of 9×2.5×0.45 mm$^3$ (length×width×height) was assembled using two cover glasses (commercially available from Matsunami Glass Ind., Ltd.). A double-sided tape was used as a spacer.

The flow cell was filled with 5 µL of a casein buffer (obtained by adding 0.5 mg/mL of casein to a BRB80 buffer) and incubated for 3 minutes. Then, a 0.3 µM kinesin solution was introduced into the flow cell and incubated for 5 minutes. As a result, the surface of the flow cell was covered with a kinesin density of 4,000 molecules/µm$^2$.

Then, the flow cell was washed with 5 µL of a washing buffer (obtained by adding 1 mM dithiothreitol (DTT) and 10 µM taxol to a BRB80 buffer) and a solution containing microtubules labeled with 5 µL of red fluorescence (microtubules to which r-DNA labeled with TAMRA was bound) was then introduced and incubation was performed for 2 minutes, and washing with 10 µL of a washing buffer was performed.

Then, a solution containing microtubules labeled with 5 µL of green fluorescence (microtubules to which r-DNA labeled with FAM was bound) was introduced and incubation was performed for 2 minutes. Washing with 10 µL of a mobility buffer (80 mM PIPES, 1 mM EGTA, 2 mM MgCl$_2$, 1 mM DTT, 0.5 mg/mL casein, 4.5 mg/mL glucose, 50 U/mL glucose oxidase, 50 U/mL catalase, 10 µM taxol, 0.2% methyl cellulose, 5 mM ATP, 1 mM trolox) was performed. The microtubules labeled with green fluorescence were mixed with l-DNA and incubated at room temperature for 15 minutes before they were introducing into the flow cell.

Movement of the microtubules was initiated by adding 5 µL of an ATP buffer (obtained by adding 5 mM ATP, 4.5 mg/mL D-glucose, 50 U/mL glucose oxidase, 50 U/mL catalase and 0.2% (w/v) methyl cellulose to a washing buffer). The time when ATP was added was 0 hour.

Immediately after the ATP buffer was added, the flow cell was left in an inert chamber system (ICS), and the microtubules were observed using a microscope at room temperature. An experiment was performed for at least 10 minutes for each condition.

(Observation Under Fluorescence Microscope)

A sample was illuminated with a 100 W mercury lamp, and observed under an epifluorescence microscope ("Eclipse Ti", Nikon) using an oil immersion objective lens ("Plan Apo 60×N.A.1.4", Nikon).

A UV cutoff filter block (TRITC: EX540/25, DM565, BA605/55, GFP-B: EX460-500, DM505, BA510-560, Nikon) was used in an optical path of the microscope. Images were captured using a cooling CMOS camera ("NEO sCMOS", commercially available from Andor Co., Ltd.) connected to a computer.

In order to reduce photofading of the sample, two ND filters (ND4: a transmittance of 25% for TRITC, and ND1: a transmittance of 100% for GFP-B) were inserted into an illumination optical path of the fluorescence microscope.

When an azobenzene unit was isomerized, light that passed through a UV-1A filter block (UV-1A: EX365-410, DM400, BA400, Nikon) was emitted to the flow cell.

Experimental Example 1

(Movement of Microtubules to which DNA was Bound)

Due to a copper-free click reaction, microtubules were bound to a single-stranded DNA at a rate of one single-stranded DNA per tubulin dimer. In order to allow the microtubules to be observed under the fluorescence microscope, either DNA or microtubules were labeled with a fluorescent dye.

Figure 2:
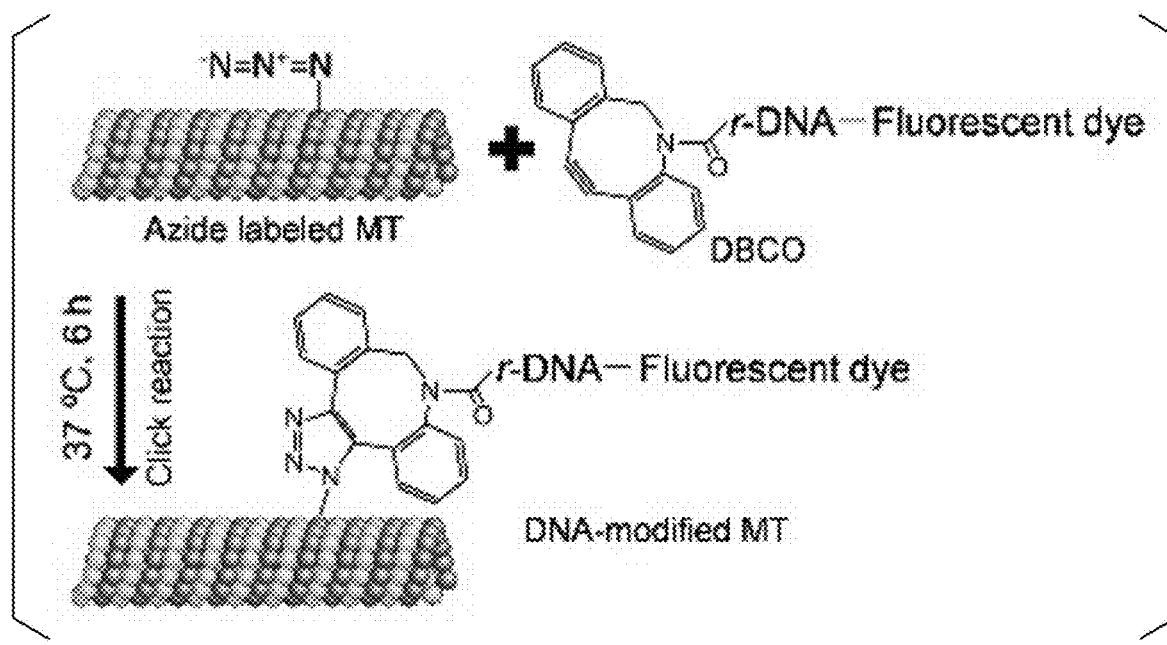
FIG. 2 is a schematic view illustrating a process of binding a receptor DNA (r-DNA) and azide microtubules due to a click reaction.

FIG. 2 is a schematic view illustrating a process of binding r-DNA and azide microtubules due to a click reaction. In FIG. 2, "MT" indicates a microtubule. Based on simulation results of the melting temperature (Tm), the number of bases in the DNA strand was fixed at 16, and Tm was higher than an operating temperature (25° C.) of a biomolecular motor system.

Figure 3:
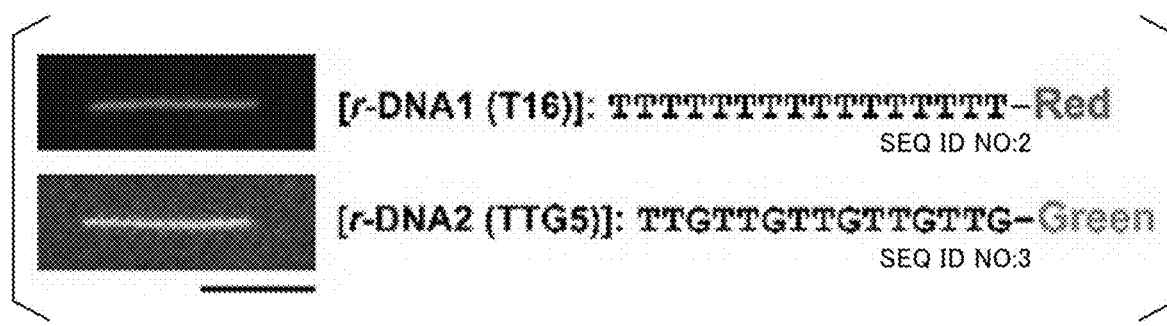
FIG. 3(a) is a fluorescence microscope image of a microtubule bound to DNA labeled with TAMRA.
FIG. 3(b) is a fluorescence microscope image of microtubules bound to DNA labeled with FAM.

FIG. 3($a$) is a fluorescence microscope image of a microtubule bound to r-DNA1 (SEQ ID NO: 2) labeled with TAMRA. In addition, FIG. 3($b$) is a fluorescence microscope image of a microtubule bound to r-DNA2 (SEQ ID NO: 3) labeled with FAM. The scale bar indicates 5 µm. The microtubule was a cylindrical object having an outer diameter of 25 nm and a length of 2 to 10 µm.

Figure 4:
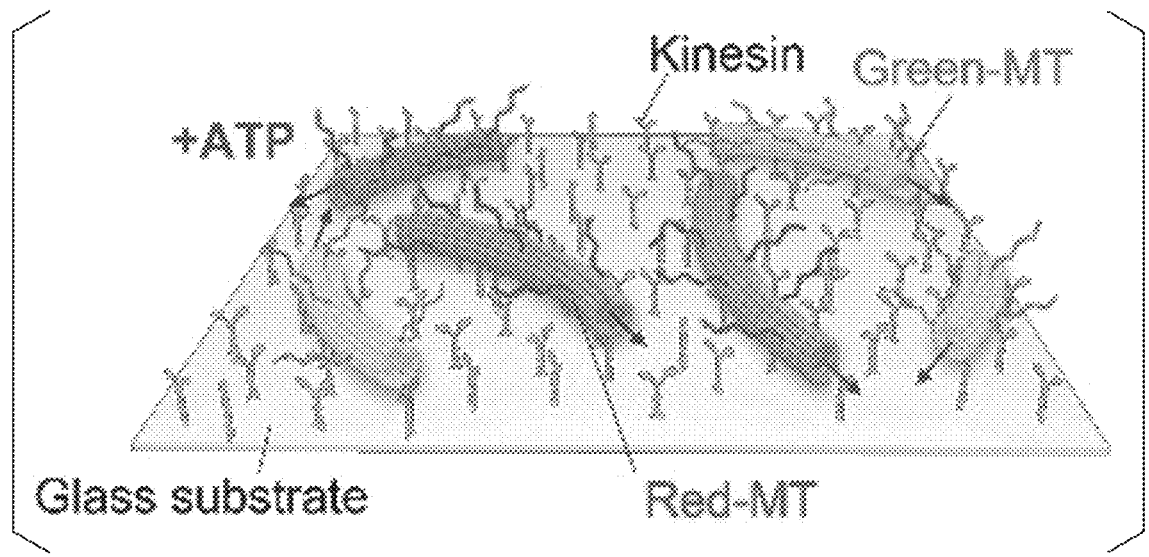
FIG. 4 is a schematic view showing a state in which microtubules labeled with red fluorescence or green fluorescence slide on a substrate whose surface is covered with kinesins.

The microtubule to which DNA was bound was propelled by kinesin attached to the surface of the substrate using chemical energy of adenosine triphosphate (ATP). FIG. 4 is a schematic view showing a state in which microtubules labeled with red fluorescence or green fluorescence slid on the substrate whose surface was covered with kinesins. In FIG. 4, "Red-MT" indicates a microtubule labeled with red fluorescence, and "Green-MT" indicates a microtubule labeled with green fluorescence.

Figure 5:
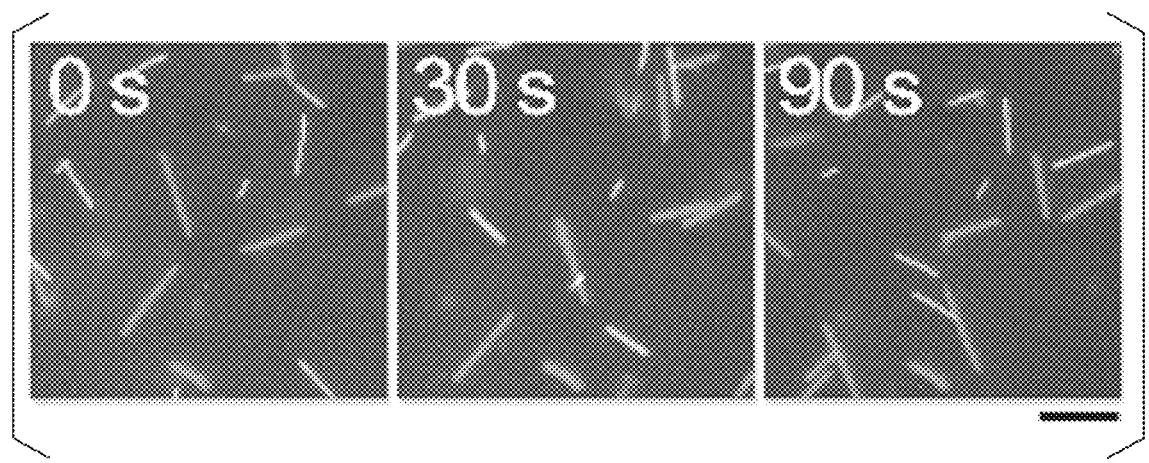
FIG. 5 shows timelapse images showing sliding of rigid microtubules labeled with red fluorescence or green fluorescence in Experimental Example 1.

FIG. 5 shows timelapse images showing sliding of rigid microtubules labeled with red fluorescence or green fluorescence. The scale bar indicates 10 µm. As a result, it was clearly found that the microtubules to which DNA was bound smoothly slid. This result indicates that DNA binding did not interfere with an interaction between the microtubules and the kinesins.

Experimental Example 2

(Association and Dissociation of Microtubules by DNA)

Microtubules bound to r-DNA1 labeled with TAMRA (red) (SEQ ID NO: 2) (hereinafter referred to as "red-labeled microtubules" in some cases) and microtubules bound to r-DNA2 labeled with FAM (green) (SEQ ID NO: 3) (hereinafter referred to as "green-labeled microtubules" in some cases) were prepared.

Then, the same numbers of red-labeled microtubules and green-labeled microtubules were arranged on a substrate coated with 0.3 µM kinesin at a total density of 50,000 microtubules/mm$^2$. As a result, as shown in FIG. 5, in the presence of ATP, the microtubules were moved without interaction.

Figure 7:
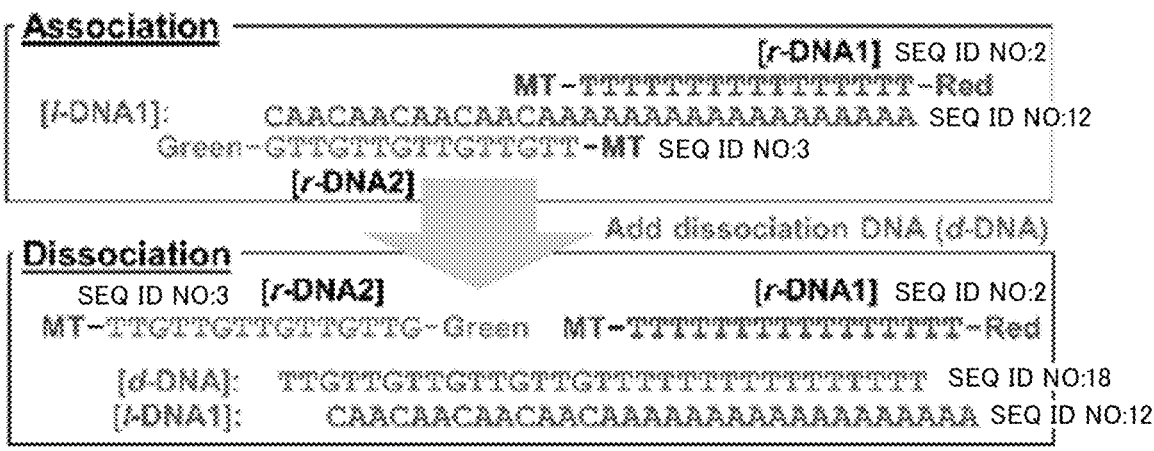
FIG. 7 is a schematic view illustrating a state in which microtubules are associated and dissociated due to an interaction of DNA base pairs.

Then, association of microtubules by a linker DNA and dissociation of associated microtubules by dissociation DNA were examined. The linker DNA (1-DNA1, SEQ ID NO: 13) was designed to be partially complementary to r-DNA so that these microtubules could be crosslinked. FIG. 6 is a schematic view showing a state in which red-labeled microtubules and green-labeled microtubules were crosslinked and associated by l-DNA1 and a state in which l-DNA1 was dissociated due to a strand exchange reaction using d-DNA (SEQ ID NO: 18) and the associated red-labeled microtubules and green-labeled microtubules were dissociated. FIG. 7 is a schematic view illustrating a state in which microtubules were associated and dissociated due to an interaction between DNA base pairs.

Figure 8:
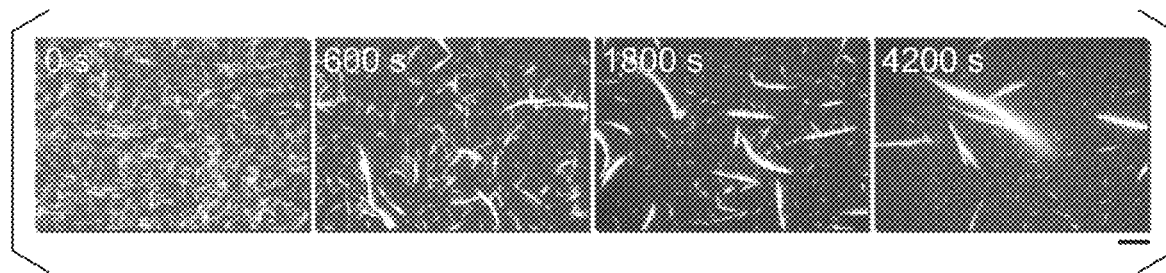
FIG. 8 shows timelapse images of a state in which microtubules are associated.

FIG. 8 shows timelapse images of a state in which microtubules were associated after a 0.6 µM l-DNA1 as an input signal was introduced. The scale bar indicates 20 µm. As shown in FIG. 8, during sliding, the red-labeled microtubules and the green-labeled microtubules approached each other and continued to move as an assembly. The size of the assembly of the microtubules increased with the merging of the assembly, and the density of the assembly decreased with the passage of time. Despite the increase in the size, the assembly of microtubules moved linearly at a speed (0.51±0.02 µm/sec) close to a movement speed (0.60±0.05 µm/sec) of each of the microtubules.

Figure 9:
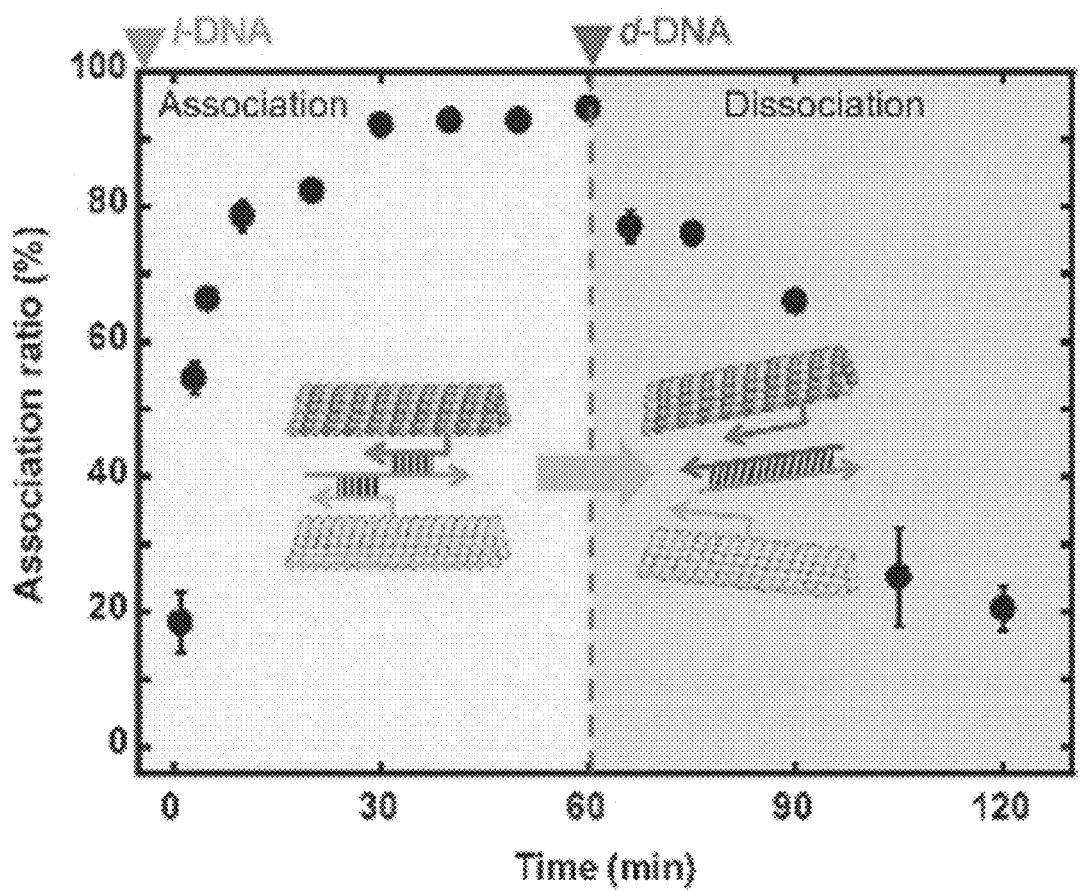
FIG. 9 is a graph showing transitions of an association ratio (%) in Experimental Example 2.

The numbers of microtubules were calculated at different times, a ratio of microtubules incorporated into the assembly to the initial number of microtubules was calculated, and thus an association ratio of the microtubules was calculated. FIG. 9 is a graph showing transitions of the association ratio (%). As a result, it was clearly found that the association ratio increased with the passage of time and reached a plateau (90 to 95%) within 60 minutes after l-DNA1 was added.

Figure 10:
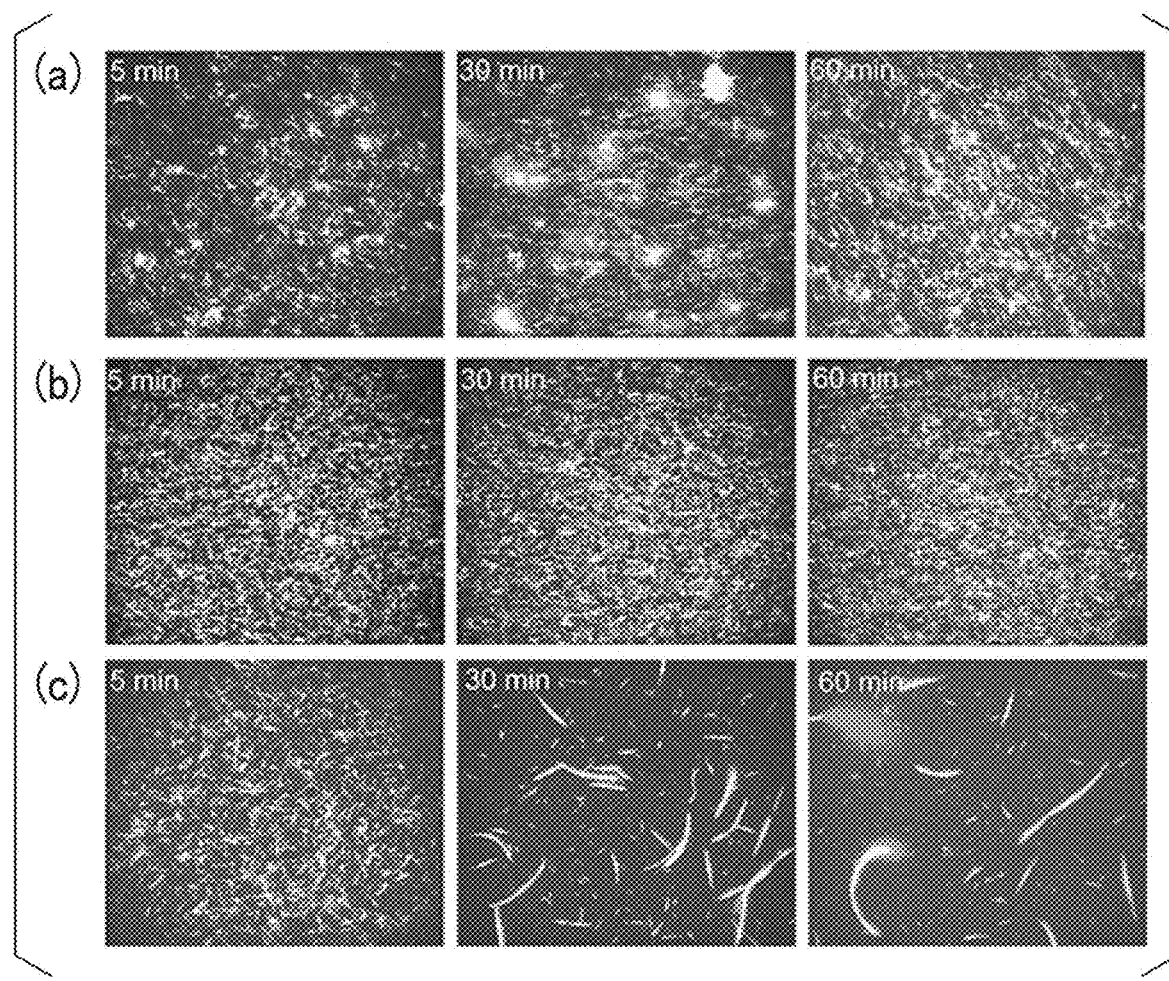
FIGS. 10(a) to 10(c) are timelapse images showing results of examining the roles of kinesin and ATP in association of microtubules.

FIGS. 10(a) to 10(c) show timelapse images showing results of examining the roles of kinesin and ATP in association of microtubules. FIG. 10(a) shows the results obtained by performing the same experiment in the absence of kinesin. As a result, freely diffusing microtubules formed an unstructured aggregate, but no assembly of the microtubules was formed.

FIG. 10(b) shows the results obtained by performing the same experiment in the absence of ATP. As a result, in the absence of ATP, microtubules on the substrate coated with kinesins did not move, and no assembly of the microtubules was formed.

FIG. 10(c) shows the results obtained by performing the same experiment in the presence of ATP (5 mM). As a result, it was clearly found that the assembly of the microtubules was formed in the presence of ATP and kinesin.

In FIGS. 10(a) to 10(c), 0.6 µM of each of the red-labeled microtubules and the green-labeled microtubules was used. In addition, the concentration of l-DNA was 0.6 µM. In addition, the concentration of kinesin was 0 µM in FIG. 10(a), and 0.3 µM in FIGS. 10(b) and 10(c). The scale bar indicates 50 µm.

Figure 11:
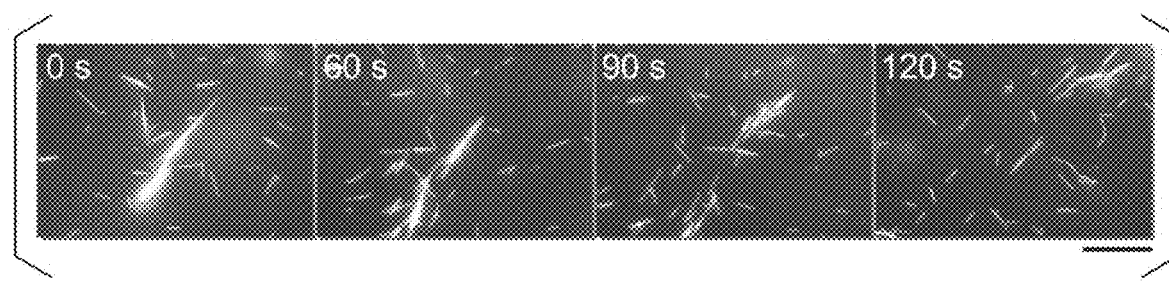
FIG. 11 shows timelapse images of a state in which the assembly of microtubules is dissociated after d-DNA is introduced.

Then, 0.6 µM dissociation DNA (d-DNA) was introduced, l-DNA1 was dissociated due to a DNA strand exchange reaction, and the assembly of microtubules was dissociated. FIG. 11 shows timelapse images of a state in which the assembly of microtubules was dissociated after d-DNA was introduced. The scale bar indicates 20 µm. As shown in FIG. 11, it was verified that the assembly of microtubules was dissociated due to introduction of d-DNA. The assembly of microtubules was dissociated into the red-labeled microtubules and the green-labeled microtubules after d-DNA was introduced. When the number of microtubules present after dissociation was counted, it was estimated that the assembly of microtubules was composed of about 100 microtubules. FIG. 9 is a graph showing transitions of the association ratio (%).

Experimental Example 3

(Logic Gate Based on DNA)

Based on the usefulness of DNA as an operator in molecular computing, a logical calculation in which the assembly of microtubules was an output controlled by a DNA input, which was different from that in the related art, was verified.

Figure 12:
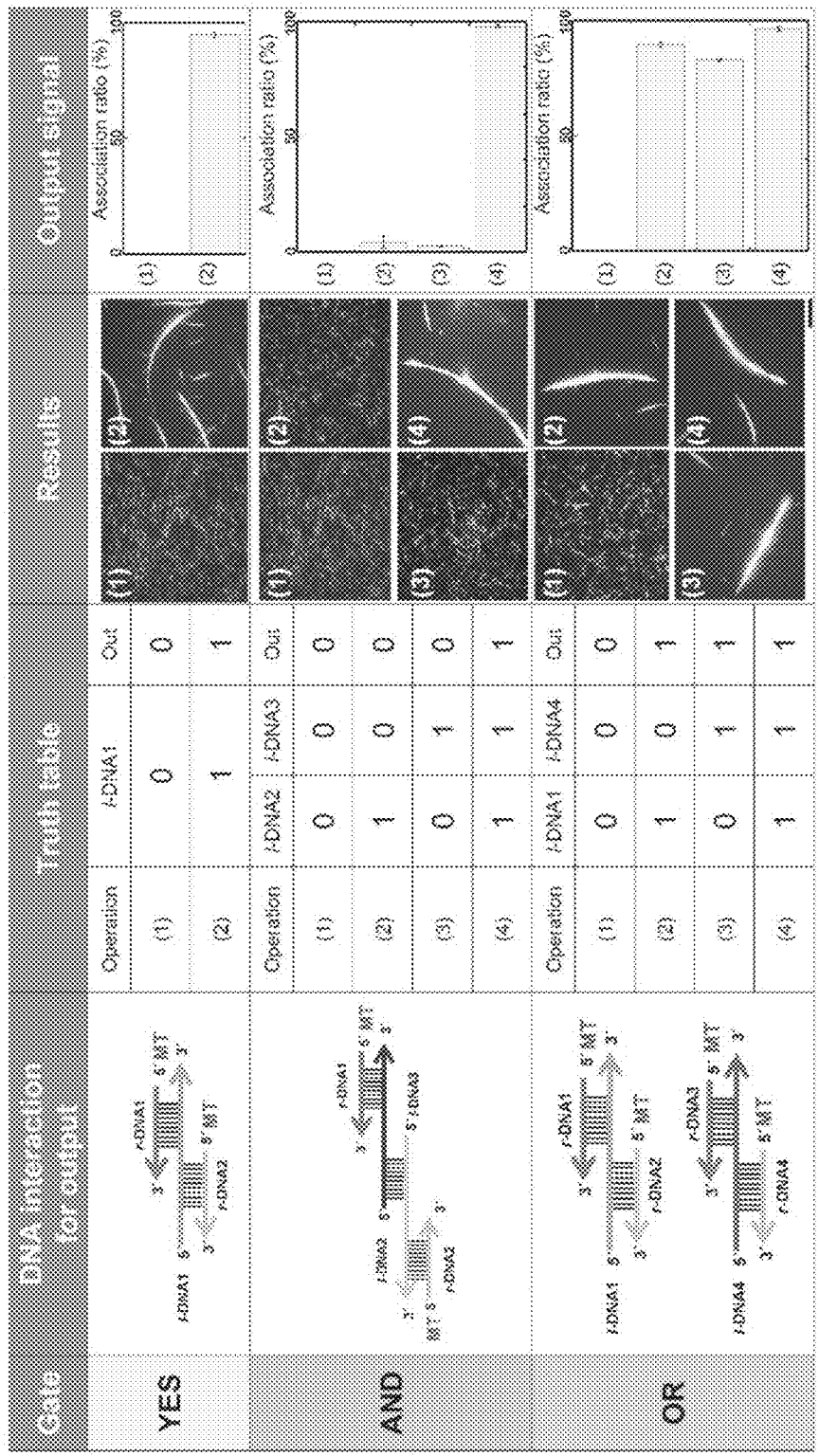
FIG. 12 is a table showing designs and verification results of logic gates composed of microtubules in Experimental Example 3.

FIG. 12 is a table showing designs and verification results of logic gates composed of microtubules. The concentration of the red-labeled microtubules and the green-labeled microtubules was 0.6 µM, the concentration of kinesin was 0.3 µM, and the concentration of l-DNA was 0.6 µM. In FIG. 12, the scale bar indicates 20 µm.

As shown in FIG. 12, a YES logic gate could be realized using l-DNA1 (SEQ ID NO: 13) as an input 1 and an assembly of red-labeled microtubules and green-labeled microtubules as an output 1.

In addition, an AND logic gate could be realized using l-DNA2 (SEQ ID NO: 14) and l-DNA3 (SEQ ID NO: 15) as two different linker DNA signals. l-DNA2 (SEQ ID NO: 14) was partially complementary to r-DNA1 (SEQ ID NO: 2), l-DNA3 (SEQ ID NO: 15) was partially complementary to r-DNA2 (SEQ ID NO: 3), and l-DNA2 (SEQ ID NO: 14) and l-DNA3 (SEQ ID NO: 15) were partially complementary to each other. In the AND logic gate, both l-DNA2 (SEQ ID NO: 14) and l-DNA3 (SEQ ID NO: 15) were required in order to associate the microtubules.

In addition, an OR logic gate could be realized using r-DNA1 (SEQ ID NO: 2) and r-DNA3 (SEQ ID NO: 4) labeled with TAMRA and bound to microtubules and using r-DNA2 (SEQ ID NO: 3) and r-DNA4 (SEQ ID NO: 5) labeled with FAM and bound to microtubules, and using l-DNA1 (SEQ ID NO: 13) complementary to r-DNA1 (SEQ ID NO: 2) and r-DNA2 (SEQ ID NO: 3), and l-DNA4 (SEQ ID NO: 16) complementary to r-DNA3 (SEQ ID NO: 4) and r-DNA4 (SEQ ID NO: 5) as two input signals. In the OR logic gate, the microtubules could be associated if either l-DNA1 (SEQ ID NO: 13) or l-DNA4 (SEQ ID NO: 16) was present.

As shown in FIG. 12, an association ratio of 85 to 100% was obtained in all calculations in which an output indicating 1 was expected. In addition, an association ratio of <5% was obtained in all calculations in which an output indicating 0 was expected. A significant difference was observed in the association ratio.

Experimental Example 4

(Mode of Assembly of Microtubules)

Microtubules were polymerized in the presence of GMPCPP to prepare rigid microtubules (microtubules having high rigidity). In addition, microtubules were polymerized in the presence of GTP in place of GMPCPP to prepare soft microtubules (microtubules having low rigidity). Then, the rigid microtubules and the soft microtubules were slid on a substrate covered with kinesins.

Figure 13:
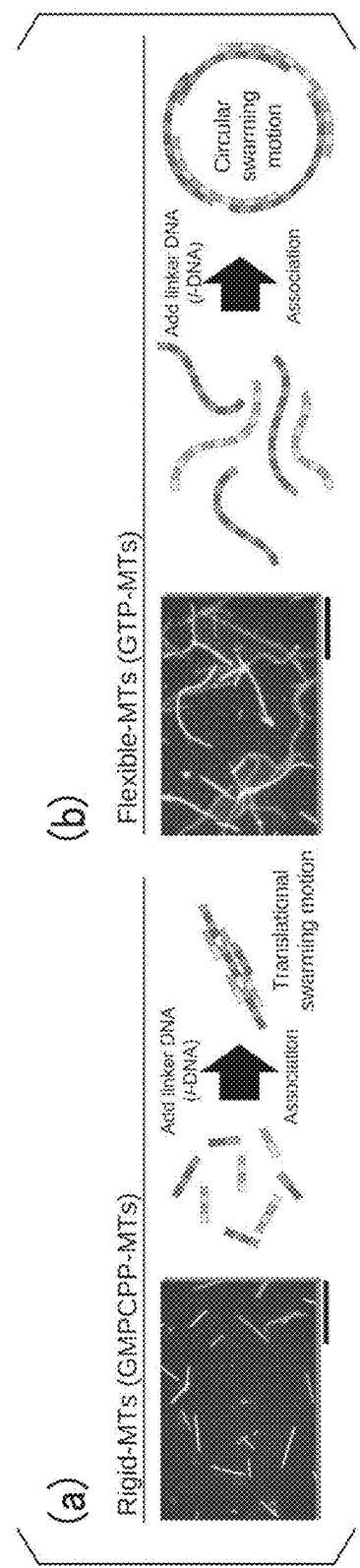
FIG. 13(a) shows a fluorescence microscope image and a schematic view showing results obtained by sliding rigid microtubules on a substrate covered with kinesins in Experimental Example 4.
FIG. 13(b) shows a fluorescence microscope image and a schematic view showing results obtained by sliding soft microtubules on a substrate covered with kinesins in Experimental Example 4.

FIG. 13(a) shows a fluorescence microscope image and a schematic view showing results obtained by sliding rigid microtubules on the substrate covered with kinesins. The scale bar indicates 20 µm. In addition, FIG. 13(b) shows a fluorescence microscope image and a schematic view showing results obtained by sliding soft microtubules on the substrate covered with kinesins. The scale bar indicates 20 µm. As a result, it was clearly found that the rigid microtubules moved linearly, whereas the soft microtubules moved in a more curved path than the rigid microtubules. The path persistence length of the soft microtubules was 245±32 μm, and the path persistence length of the rigid microtubules was 582±97 μm. This result reflected a difference that was twice the difference in rigidity or more.

Figure 14:
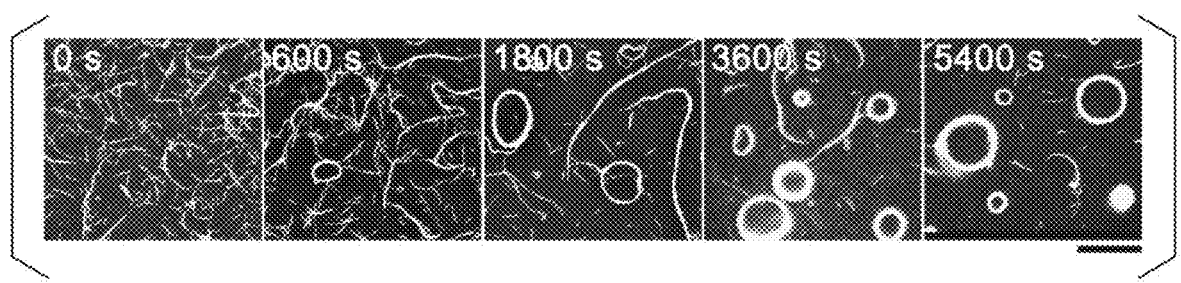
FIG. 14 shows timelapse images of a state in which an assembly of soft microtubules is slid on a substrate covered with kinesins in Experimental Example 4.

FIG. 14 shows timelapse images of a state in which soft microtubules were bound to r-DNA1 (SEQ ID NO: 2) and r-DNA2 (SEQ ID NO: 3) and slid on the substrate covered with kinesins, and a 0.6 μM l-DNA1 was added. The scale bar indicates 20 μm. As a result, it was clearly found that the assembly of microtubules formed a ring and moved circularly.

Figure 15:
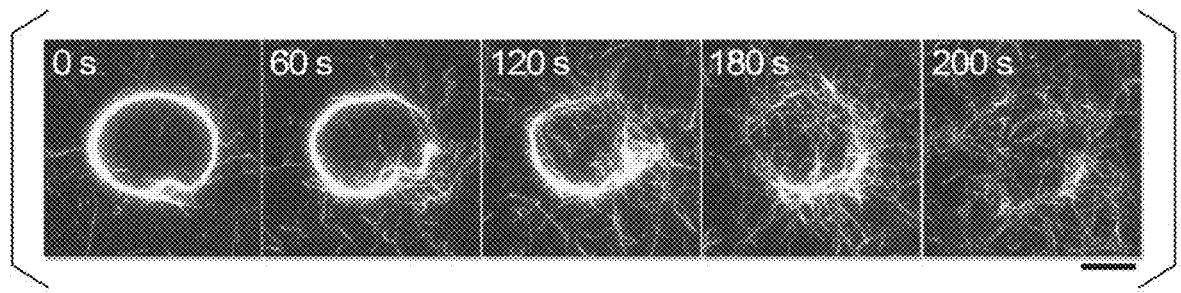
FIG. 15 shows timelapse images of a state in which d-DNA is added to an assembly of microtubules that circularly move in Experimental Example 4.

FIG. 15 shows timelapse images of a state in which a 0.6 μM d-DNA was added to the assembly of microtubules that moved circularly. The scale bar indicates 20 μm. As a result, the assembly of microtubules was dissociated. One assembly was formed from about 300 microtubules. In addition, the dissociated single microtubules maintained a function of sliding on the substrate covered with kinesins.

Experimental Example 5

(Orthogonal Control of Assembly of Microtubules)

An examination was conducted to control association of soft microtubules and rigid microtubules without cross talk according to selective hybridization properties of DNA. Two types of microtubules having different lengths and rigidities were conjugated with two different DNA logic gates.

The soft microtubules were bound to r-DNA1 (SEQ ID NO: 2) and r-DNA2 (SEQ ID NO: 3). In addition, the rigid microtubules were bound to r-DNA5 (SEQ ID NO: 6) and r-DNA6 (SEQ ID NO: 7).

Figure 16:
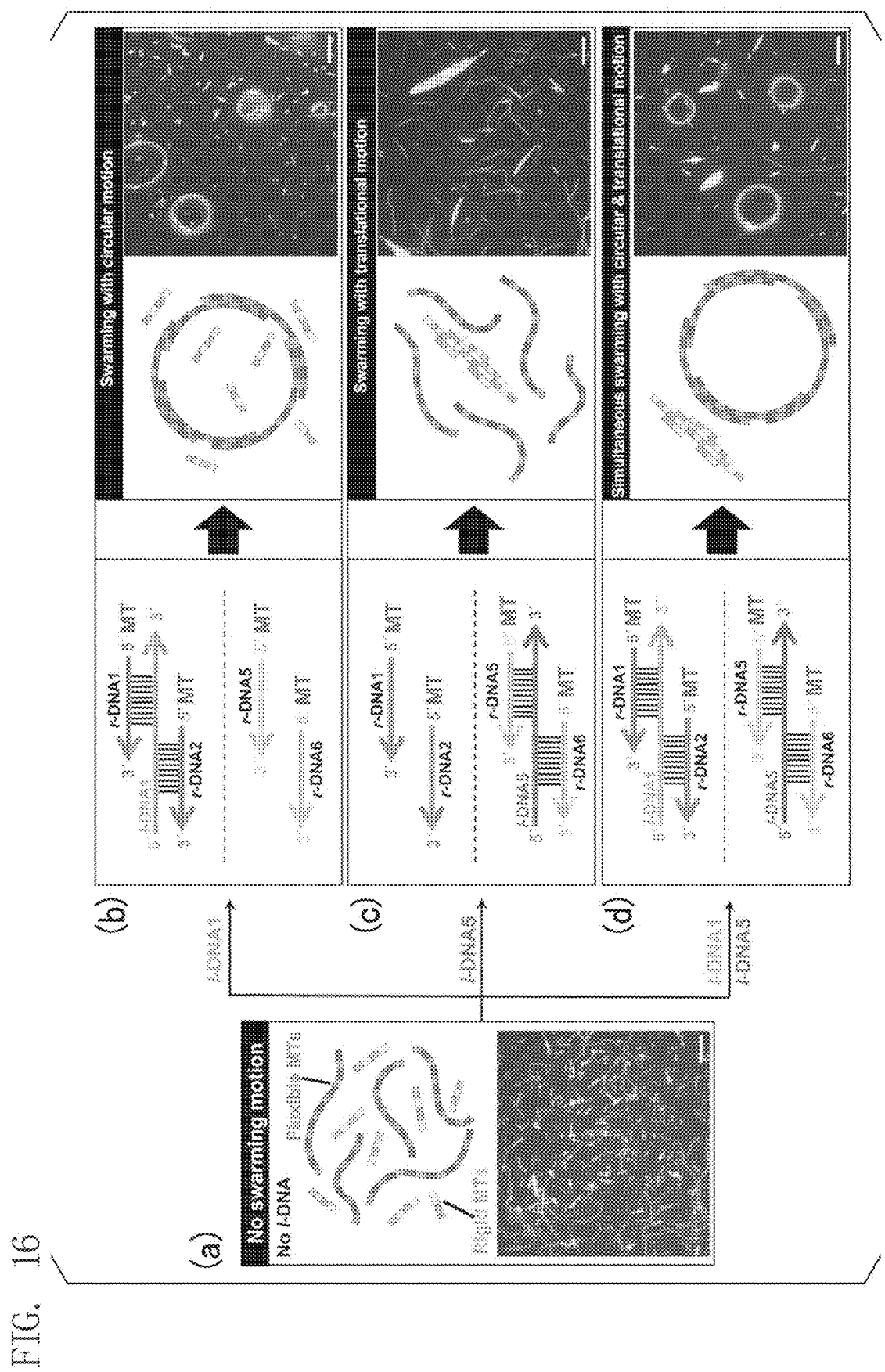
FIG. 16(a) shows a schematic view and a fluorescence microscope image of microtubules having different rigidities in Experimental Example 5.
FIG. 16(b) shows an image and a schematic view of results when l-DNA1 (SEQ ID NO: 13) is input in Experimental Example 5.
FIG. 16(c) shows an image and a schematic view of results when l-DNA5 (SEQ ID NO: 17) is input in Experimental Example 5.
FIG. 16(d) shows an image and a schematic view of results when l-DNA1 (SEQ ID NO: 13) and l-DNA5 (SEQ ID NO: 17) are input in Experimental Example 5.

FIG. 16(a) shows a schematic view and a fluorescence microscope image of microtubules having different rigidities. As shown in FIG. 16(b), when l-DNA1 (SEQ ID NO: 13) was input, the soft microtubules formed a circular assembly by hybridization with r-DNA1 (SEQ ID NO: 2) and r-DNA2 (SEQ ID NO: 3).

In addition, as shown in FIG. 16(c), when l-DNA5 (SEQ ID NO: 17) was input, the rigid microtubules moved linearly by hybridization with r-DNA5 (SEQ ID NO: 6) and r-DNA6 (SEQ ID NO: 7).

In addition, as shown in FIG. 16(d), when both l-DNA1 (SEQ ID NO: 13) and 1-DNA5 (SEQ ID NO: 17) were input, both a linear movement and a tubular movement were formed simultaneously.

In FIGS. 16(b) to 16(d), the concentration of each of the soft microtubules and the rigid microtubules was 0.6 μM, and the concentration of kinesin was 0.3 μM, and the concentration of each l-DNA was 0.6 μM. The scale bar indicates 20 μm.

Experimental Example 6

(Control of Association of Microtubules with Light)

In order to obtain a reversible, non-invasive, and rapid method of altering a DNA input, the inventors examined incorporating photoresponsive DNA (p-DNA).

Specifically, azobenzene as a photoresponsive molecule was introduced into two DNA strands. Accordingly, it was possible to switch hybridization on/off between two DNA strands. The switching resulted from the change in the melting temperature (Tm) of DNA hybridization caused by cis-trans isomerization of azobenzene moieties according to emitted UV light (UV) or visible light.

FIG. 17 is a schematic view illustrating a state in which DNA hybridization was reversibly switched on/off by cis-trans isomerization of azobenzene moieties of two pieces of photoresponsive DNA. In addition, FIG. 18 is a schematic view illustrating a state in which, when UV or visible light was emitted to microtubules to which p-DNA was bound, an assembly was formed and dissociated.

p-DNA1 (SEQ ID NO: 19) and p-DNA2 (SEQ ID NO: 20) as a photoresponsive DNA were designed so that Tm was <20° C. in a cis form, and 60° C. in a trans form. Then, p-DNA1 (SEQ ID NO: 19) and p-DNA2 (SEQ ID NO: 20) were bound to microtubules that were already fluorescently labeled with TAMRA and FAM (hereinafter referred to as "red-labeled microtubules" and "green-labeled microtubules" in some cases). In addition, it was confirmed that the microtubules to which p-DNA was bound moved on the substrate covered with kinesins without losing mobility.

Figure 19:
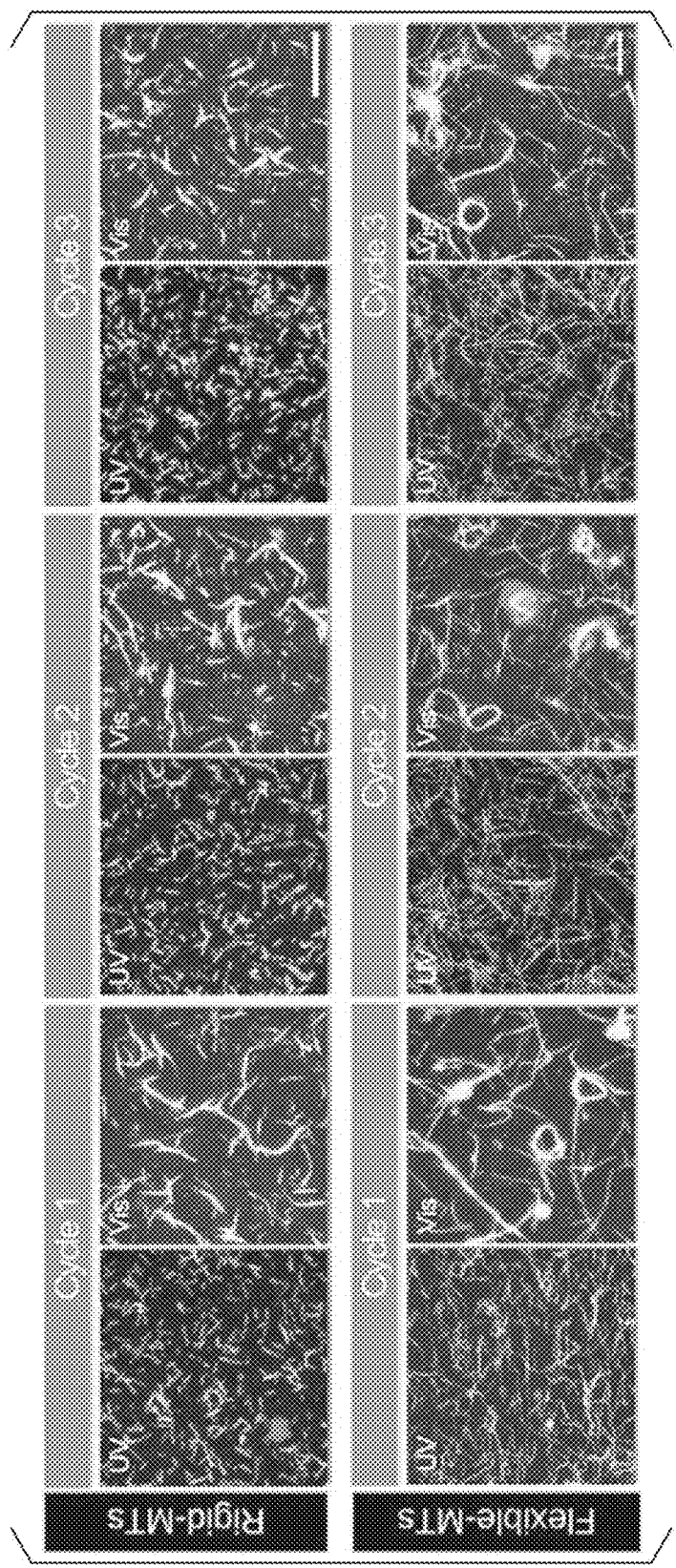
FIG. 19 shows fluorescence microscope images of a state in which UV or visible light is emitted to red-labeled microtubules and green-labeled microtubules in Experimental Example 6.

FIG. 19 shows fluorescence microscope images of a state in which UV or visible light was emitted to red-labeled microtubules and green-labeled microtubules. The concentration of microtubules was 0.6 μM for each of the red-labeled microtubules and the green-labeled microtubules, and the concentration of kinesin was 0.8 μM. The scale bar indicates 20 μm.

First, UV (with a wavelength of 365 nm) was emitted to the microtubules and an azobenzene group in a cis form was initialized. Then, when visible light (with a wavelength of 480 nm) was emitted to the microtubules, isomerization of azobenzene from a cis form to a trans form was caused, hybridization of p-DNA1 and p-DNA2 was possible, and an assembly of the microtubules was formed. Then, when UV was emitted to the microtubules, the assembly of the microtubules was dissociated into individual microtubules.

FIG. 19 shows a state in which association and dissociation according to an optical switch were repeated over 3 cycles. As shown in FIG. 19, when the rigid microtubules were used, a mode of the assembly of photoresponsive microtubules was a linear movement, and when the soft microtubules were used, a mode of the assembly of photoresponsive microtubules was a circular movement.

In this manner, it was clearly found that, when photoresponsive moieties were introduced into DNA, association of the microtubules was repeatedly and reversibly switched due to light.

INDUSTRIAL APPLICABILITY

According to the present invention, it is possible to provide a novel technology for controlling assembling of fibers.

REFERENCE SIGNS LIST

600 Fiber assembly
610 First fiber
620 Second fiber
611 First single-stranded nucleic acid fragment (receptor DNA, r-DNA)
621 Second single-stranded nucleic acid fragment (receptor DNA, r-DNA)
630 Third single-stranded nucleic acid fragment (linker DNA, l-DNA)
640 Dissociation DNA (d-DNA)

The invention claimed is:

1. A method of moving a fiber assembly, comprising:
polymerizing tubulins in the presence of guanosine-5'-triphosphate (GTP) to form soft microtubule fibers;
associating the soft microtubule fibers with nucleic acid fragments which crosslink the fibers to form a fiber assembly, and
bringing the fiber assembly and adenosine triphosphate (ATP) into contact with each other on a substrate surface that is covered with motor proteins,
wherein the fiber assembly includes a first fiber to which a first single-stranded nucleic acid fragment is bound, a second fiber to which a second single-stranded nucleic acid fragment is bound, and a third single-stranded nucleic acid fragment that includes a region complementary to the first single-stranded nucleic acid fragment and a region complementary to the second single-stranded nucleic acid fragment, and
wherein the fiber assembly moves in an arc using the chemical energy of the ATP.

2. The method of claim 1, wherein the first single-stranded nucleic acid fragment, the second single-stranded nucleic acid fragment, and the third single-stranded nucleic acid fragment are selected from the group consisting of: (a) SEQ ID NO: 2, SEQ ID NO: 3, and SEQ ID NO: 8, respectively; (b) SEQ ID NO: 2, SEQ ID NO: 3, and SEQ ID NO: 9, respectively; (c) SEQ ID NO: 2, SEQ ID NO: 3, and SEQ ID NO: 10, respectively; (d) SEQ ID NO: 2, SEQ ID NO: 3, and SEQ ID NO: 12, respectively; (e) SEQ ID NO: 4, SEQ ID NO: 5, and SEQ ID NO: 16, respectively; and (f) SEQ ID NO: 6, SEQ ID NO: 7, and SEQ ID NO: 17, respectively.

3. A method of moving a fiber assembly, comprising:
polymerizing tubulins in the presence of guanosine-5'-[α,β-methylene]triphosphate (GMPCPP) to form rigid microtubule fibers;
associating the rigid microtubule fibers with nucleic acid fragments which crosslink the fibers to form a fiber assembly, and
bringing the fiber assembly and adenosine triphosphate (ATP) into contact with each other on a substrate surface that is covered with motor proteins,
wherein the fiber assembly includes a first fiber to which a first single-stranded nucleic acid fragment is bound, a second fiber to which a second single-stranded nucleic acid fragment is bound, and a third single-stranded nucleic acid fragment that includes a region complementary to the first single-stranded nucleic acid fragment and a region complementary to the second single-stranded nucleic acid fragment, and
wherein the fiber assembly moves linearly using the chemical energy of the ATP.

4. The method of claim 3, wherein the first single-stranded nucleic acid fragment, the second single-stranded nucleic acid fragment, and the third single-stranded nucleic acid fragment are selected from the group consisting of: (a) SEQ ID NO: 2, SEQ ID NO: 3, and SEQ ID NO: 8, respectively; (b) SEQ ID NO: 2, SEQ ID NO: 3, and SEQ ID NO: 9, respectively; (c) SEQ ID NO: 2, SEQ ID NO: 3, and SEQ ID NO: 10, respectively; (d) SEQ ID NO: 2, SEQ ID NO: 3, and SEQ ID NO: 12, respectively; (e) SEQ ID NO: 4, SEQ ID NO: 5, and SEQ ID NO: 16, respectively; and (f) SEQ ID NO: 6, SEQ ID NO: 7, and SEQ ID NO: 17, respectively.

5. The method according to claim 1 or 3, wherein the motor proteins are kinesins or dyneins.

* * * * *

SEQUENCE LISTING

<160> NUMBER OF SEQ ID NOS: 20

<210> SEQ ID NO 1
<211> LENGTH: 613
<212> TYPE: PRT
<213> ORGANISM: Artificial Sequence
<220> FEATURE:
<223> OTHER INFORMATION: Synthesized protein derived from human

<400> SEQUENCE: 1

```
Met His His His His His Leu Val Pro Arg Gly Ser Lys Glu Thr
1               5                   10                  15

Ala Ala Ala Lys Phe Glu Arg Gln His Met Asp Ser Asp Asp Asp
                20                  25                  30

Lys Ala Met Ala Ile Ser Asp Pro Met Ala Asp Leu Ala Glu Cys Asn
                35                  40                  45

Ile Lys Val Met Cys Arg Phe Arg Pro Leu Asn Glu Ser Glu Val Asn
        50                  55                      60

Arg Gly Asp Lys Tyr Ile Ala Lys Phe Gln Gly Glu Asp Thr Val Val
65                  70                  75                  80

Ile Ala Ser Lys Pro Tyr Ala Phe Asp Arg Val Phe Gln Ser Ser Thr
                85                  90                  95

Ser Gln Glu Gln Val Tyr Asn Asp Cys Ala Lys Lys Ile Val Lys Asp
                100                 105                 110

Val Leu Glu Gly Tyr Asn Gly Thr Ile Phe Ala Tyr Gly Gln Thr Ser
                115                 120                 125

Ser Gly Lys Thr His Thr Met Glu Gly Lys Leu His Asp Pro Glu Gly
                130                 135                 140

Met Gly Ile Ile Pro Arg Ile Val Gln Asp Ile Phe Asn Tyr Ile Tyr
145                 150                 155                 160

Ser Met Asp Glu Asn Leu Glu Phe His Ile Lys Val Ser Tyr Phe Glu
                165                 170                 175

Ile Tyr Leu Asp Lys Ile Arg Asp Leu Leu Asp Val Ser Lys Thr Asn
                180                 185                 190

Leu Ser Val His Glu Asp Lys Asn Arg Val Pro Tyr Val Lys Gly Cys
                195                 200                 205

Thr Glu Arg Phe Val Cys Ser Pro Asp Glu Val Met Asp Thr Ile Asp
                210                 215                 220

Glu Gly Lys Ser Asn Arg His Val Ala Val Thr Asn Met Asn Glu His
225                 230                 235                 240

Ser Ser Arg Ser His Ser Ile Phe Leu Ile Asn Val Lys Gln Glu Asn
                245                 250                 255

Thr Gln Thr Glu Gln Lys Leu Ser Gly Lys Leu Tyr Leu Val Asp Leu
                260                 265                 270

Ala Gly Ser Glu Lys Val Ser Lys Thr Gly Ala Glu Gly Ala Val Leu
                275                 280                 285

Asp Glu Ala Lys Asn Ile Asn Lys Ser Leu Ser Ala Leu Gly Asn Val
                290                 295                 300

Ile Ser Ala Leu Ala Glu Gly Ser Thr Tyr Val Pro Tyr Arg Asp Ser
305                 310                 315                 320

Lys Met Thr Arg Ile Leu Gln Asp Ser Leu Gly Gly Asn Cys Arg Thr
                325                 330                 335

Thr Ile Val Ile Cys Cys Ser Pro Ser Ser Tyr Asn Glu Ser Glu Thr
                340                 345                 350

Lys Ser Thr Leu Leu Phe Gly Gln Arg Ala Lys Thr Ile Lys Asn Thr
```

```
                   355                 360                 365
Val Cys Val Asn Val Glu Leu Thr Ala Glu Gln Trp Lys Lys Lys Tyr
370                 375                 380

Glu Lys Glu Lys Glu Lys Asn Lys Ile Leu Arg Asn Thr Ile Gln Trp
385                 390                 395                 400

Leu Glu Asn Glu Leu Asn Arg Trp Arg Asn Gly Glu Thr Val Pro Ile
                405                 410                 415

Asp Glu Gln Phe Asp Lys Glu Lys Ala Asn Leu Glu Ala Phe Thr Val
                420                 425                 430

Asp Lys Asp Ile Thr Leu Thr Asn Asp Lys Pro Ala Thr Ala Ile Gly
                435                 440                 445

Val Ile Gly Asn Phe Thr Asp Ala Glu Arg Arg Lys Cys Glu Glu Glu
        450                 455                 460

Ile Ala Lys Leu Tyr Lys Gln Leu Asp Asp Lys Asp Glu Glu Ile Asn
465                 470                 475                 480

Gln Gln Ser Gln Leu Val Glu Lys Leu Lys Thr Gln Met Leu Asp Gln
                485                 490                 495

Glu Glu Leu Leu Ala Ser Thr Arg Arg Asp Gln Asp Asn Met Gln Ala
                500                 505                 510

Glu Leu Asn Arg Leu Gln Ala Glu Asn Asp Ala Ser Lys Glu Glu Val
            515                 520                 525

Lys Glu Val Leu Gln Ala Leu Glu Glu Leu Ala Val Asn Tyr Asp Gln
530                 535                 540

Lys Ser Gln Glu Val Glu Asp Lys Thr Lys Glu Tyr Glu Leu Leu Ser
545                 550                 555                 560

Asp Glu Leu Asn Gln Lys Ser Ala Thr Leu Ala Ser Ile Asp Ala Glu
                565                 570                 575

Leu Gln Lys Leu Lys Glu Met Thr Asn His Gln Lys Lys Arg Ala Ala
                580                 585                 590

Glu Met Met Ala Ser Leu Leu Lys Asp Leu Ala Glu Ile Gly Ile Ala
                595                 600                 605

Val Gly Asn Asn Asp
    610

<210> SEQ ID NO 2
<211> LENGTH: 16
<212> TYPE: DNA
<213> ORGANISM: Artificial Sequence
<220> FEATURE:
<223> OTHER INFORMATION: Synthesized oligonucleotide
<220> FEATURE:
<221> NAME/KEY: misc_feature
<222> LOCATION: (1)..(1)
<223> OTHER INFORMATION: DBCO-modified
<220> FEATURE:
<221> NAME/KEY: misc_feature
<222> LOCATION: (16)..(16)
<223> OTHER INFORMATION: TAMRA-modified

<400> SEQUENCE: 2
tttttttttt tttttt                                              16

<210> SEQ ID NO 3
<211> LENGTH: 15
<212> TYPE: DNA
<213> ORGANISM: Artificial Sequence
<220> FEATURE:
<223> OTHER INFORMATION: Synthesized oligonucleotide
<220> FEATURE:
<221> NAME/KEY: misc_feature
```

```
<222> LOCATION: (1)..(1)
<223> OTHER INFORMATION: DBCO-modified
<220> FEATURE:
<221> NAME/KEY: misc_feature
<222> LOCATION: (15)..(15)
<223> OTHER INFORMATION: FAM-modified

<400> SEQUENCE: 3
ttgttgttgt tgttg                                                    15

<210> SEQ ID NO 4
<211> LENGTH: 15
<212> TYPE: DNA
<213> ORGANISM: Artificial Sequence
<220> FEATURE:
<223> OTHER INFORMATION: Synthesized oligonucleotide
<220> FEATURE:
<221> NAME/KEY: misc_feature
<222> LOCATION: (1)..(1)
<223> OTHER INFORMATION: DBCO-modified
<220> FEATURE:
<221> NAME/KEY: misc_feature
<222> LOCATION: (15)..(15)
<223> OTHER INFORMATION: TAMRA-modified

<400> SEQUENCE: 4
ttcttcttct tcttc                                                    15

<210> SEQ ID NO 5
<211> LENGTH: 15
<212> TYPE: DNA
<213> ORGANISM: Artificial Sequence
<220> FEATURE:
<223> OTHER INFORMATION: Synthesized oligonucleotide
<220> FEATURE:
<221> NAME/KEY: misc_feature
<222> LOCATION: (1)..(1)
<223> OTHER INFORMATION: DBCO-modified
<220> FEATURE:
<221> NAME/KEY: misc_feature
<222> LOCATION: (15)..(15)
<223> OTHER INFORMATION: FAM-modified

<400> SEQUENCE: 5
tagtagtagt agtag                                                    15

<210> SEQ ID NO 6
<211> LENGTH: 16
<212> TYPE: DNA
<213> ORGANISM: Artificial Sequence
<220> FEATURE:
<223> OTHER INFORMATION: Synthesized oligonucleotide
<220> FEATURE:
<221> NAME/KEY: misc_feature
<222> LOCATION: (1)..(1)
<223> OTHER INFORMATION: DBCO-modified
<220> FEATURE:
<221> NAME/KEY: misc_feature
<222> LOCATION: (16)..(16)
<223> OTHER INFORMATION: FAM-modified

<400> SEQUENCE: 6
gcggcttgac atacca                                                   16

<210> SEQ ID NO 7
<211> LENGTH: 17
<212> TYPE: DNA
<213> ORGANISM: Artificial Sequence
<220> FEATURE:
<223> OTHER INFORMATION: Synthesized oligonucleotide
<220> FEATURE:
```

```
<221> NAME/KEY: misc_feature
<222> LOCATION: (1)..(1)
<223> OTHER INFORMATION: DBCO-modified
<220> FEATURE:
<221> NAME/KEY: misc_feature
<222> LOCATION: (17)..(17)
<223> OTHER INFORMATION: FAM-modified

<400> SEQUENCE: 7
caccagccag tctgtta                                                      17

<210> SEQ ID NO 8
<211> LENGTH: 19
<212> TYPE: DNA
<213> ORGANISM: Artificial Sequence
<220> FEATURE:
<223> OTHER INFORMATION: Synthesized oligonucleotide

<400> SEQUENCE: 8
caaaaaaaaa aaaaaaaa                                                     19

<210> SEQ ID NO 9
<211> LENGTH: 22
<212> TYPE: DNA
<213> ORGANISM: Artificial Sequence
<220> FEATURE:
<223> OTHER INFORMATION: Synthesized oligonucleotide

<400> SEQUENCE: 9
caacaaaaaa aaaaaaaaaa aa                                                22

<210> SEQ ID NO 10
<211> LENGTH: 25
<212> TYPE: DNA
<213> ORGANISM: Artificial Sequence
<220> FEATURE:
<223> OTHER INFORMATION: Synthesized oligonucleotide

<400> SEQUENCE: 10
caacaacaaa aaaaaaaaaa aaaaa                                             25

<210> SEQ ID NO 11
<211> LENGTH: 28
<212> TYPE: DNA
<213> ORGANISM: Artificial Sequence
<220> FEATURE:
<223> OTHER INFORMATION: Synthesized oligonucleotide

<400> SEQUENCE: 11
caacaacaac aaaaaaaaaa aaaaaaaa                                          28

<210> SEQ ID NO 12
<211> LENGTH: 31
<212> TYPE: DNA
<213> ORGANISM: Artificial Sequence
<220> FEATURE:
<223> OTHER INFORMATION: Synthesized oligonucleotide

<400> SEQUENCE: 12
caacaacaac aacaaaaaaa aaaaaaaaaa a                                      31

<210> SEQ ID NO 13
<211> LENGTH: 31
<212> TYPE: DNA
<213> ORGANISM: Artificial Sequence
<220> FEATURE:
<223> OTHER INFORMATION: Synthesized oligonucleotide
```

<400> SEQUENCE: 13
caacaacaac aacaaaaaaa aaaaaaaaaa a                                     31

<210> SEQ ID NO 14
<211> LENGTH: 26
<212> TYPE: DNA
<213> ORGANISM: Artificial Sequence
<220> FEATURE:
<223> OTHER INFORMATION: Synthesized oligonucleotide

<400> SEQUENCE: 14
actcgtgcag aaaaaaaaaa aaaaaa                                          26

<210> SEQ ID NO 15
<211> LENGTH: 25
<212> TYPE: DNA
<213> ORGANISM: Artificial Sequence
<220> FEATURE:
<223> OTHER INFORMATION: Synthesized oligonucleotide

<400> SEQUENCE: 15
ctgcacgagt caacaacaac aacaa                                           25

<210> SEQ ID NO 16
<211> LENGTH: 30
<212> TYPE: DNA
<213> ORGANISM: Artificial Sequence
<220> FEATURE:
<223> OTHER INFORMATION: Synthesized oligonucleotide

<400> SEQUENCE: 16
ctactactac tactagaaga agaagaagaa                                      30

<210> SEQ ID NO 17
<211> LENGTH: 33
<212> TYPE: DNA
<213> ORGANISM: Artificial Sequence
<220> FEATURE:
<223> OTHER INFORMATION: Synthesized oligonucleotide

<400> SEQUENCE: 17
tggtatgtca agccgctaac agactggctg gtg                                  33

<210> SEQ ID NO 18
<211> LENGTH: 31
<212> TYPE: DNA
<213> ORGANISM: Artificial Sequence
<220> FEATURE:
<223> OTHER INFORMATION: Synthesized oligonucleotide

<400> SEQUENCE: 18
tttttttttt tttttttgttg ttgttgttgt t                                   31

<210> SEQ ID NO 19
<211> LENGTH: 31
<212> TYPE: DNA
<213> ORGANISM: Artificial Sequence
<220> FEATURE:
<223> OTHER INFORMATION: Synthesized oligonucleotide
<220> FEATURE:
<221> NAME/KEY: misc_feature
<222> LOCATION: (1)..(1)
<223> OTHER INFORMATION: DBCO-modified
<220> FEATURE:
<221> NAME/KEY: misc_feature
<222> LOCATION: (4)..(4)

```
<223> OTHER INFORMATION: n is a, c, g, or t and is also an Azobenzene-
      modified nucleotide
<220> FEATURE:
<221> NAME/KEY: misc_feature
<222> LOCATION: (8)..(8)
<223> OTHER INFORMATION: n is a, c, g, or t and is also an Azobenzene-
      modified nucleotide
<220> FEATURE:
<221> NAME/KEY: misc_feature
<222> LOCATION: (12)..(12)
<223> OTHER INFORMATION: n is a, c, g, or t and is also an Azobenzene-
      modified nucleotide
<220> FEATURE:
<221> NAME/KEY: misc_feature
<222> LOCATION: (16)..(16)
<223> OTHER INFORMATION: n is a, c, g, or t and is also an Azobenzene-
      modified nucleotide
<220> FEATURE:
<221> NAME/KEY: misc_feature
<222> LOCATION: (20)..(20)
<223> OTHER INFORMATION: n is a, c, g, or t and is also an Azobenzene-
      modified nucleotide
<220> FEATURE:
<221> NAME/KEY: misc_feature
<222> LOCATION: (24)..(24)
<223> OTHER INFORMATION: n is a, c, g, or t and is also an Azobenzene-
      modified nucleotide
<220> FEATURE:
<221> NAME/KEY: misc_feature
<222> LOCATION: (28)..(28)
<223> OTHER INFORMATION: n is a, c, g, or t and is also an Azobenzene-
      modified nucleotide

<400> SEQUENCE: 19
caancaanca ancaancaan caancaanca a                                    31

<210> SEQ ID NO 20
<211> LENGTH: 27
<212> TYPE: DNA
<213> ORGANISM: Artificial Sequence
<220> FEATURE:
<223> OTHER INFORMATION: Synthesized oligonucleotide
<220> FEATURE:
<221> NAME/KEY: misc_feature
<222> LOCATION: (1)..(1)
<223> OTHER INFORMATION: DBCO-modified
<220> FEATURE:
<221> NAME/KEY: misc_feature
<222> LOCATION: (16)..(16)
<223> OTHER INFORMATION: n is a, c, g, or t and is also an Azobenzene-
      modified nucleotide
<220> FEATURE:
<221> NAME/KEY: misc_feature
<222> LOCATION: (20)..(20)
<223> OTHER INFORMATION: n is a, c, g, or t and is also an Azobenzene-
      modified nucleotide
<220> FEATURE:
<221> NAME/KEY: misc_feature
<222> LOCATION: (24)..(24)
<223> OTHER INFORMATION: n is a, c, g, or t and is also an Azobenzene-
      modified nucleotide

<400> SEQUENCE: 20
tttttttttt ttttgnttgn ttgnttg                                         27
```